(12) United States Patent
Shibata et al.

(10) Patent No.: US 12,418,733 B2
(45) Date of Patent: Sep. 16, 2025

(54) IMAGING APPARATUS AND ELECTRONIC DEVICE

(71) Applicant: Sony Semiconductor Solutions Corporation, Kanagawa (JP)

(72) Inventors: Tomohiko Shibata, Kanagawa (JP); Toshikazu Oda, Kanagawa (JP); Yuki Ozawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 94 days.

(21) Appl. No.: 18/554,602

(22) PCT Filed: Mar. 29, 2022

(86) PCT No.: PCT/JP2022/015266
§ 371 (c)(1),
(2) Date: Oct. 9, 2023

(87) PCT Pub. No.: WO2022/220095
PCT Pub. Date: Oct. 20, 2022

(65) Prior Publication Data
US 2024/0205559 A1  Jun. 20, 2024

(30) Foreign Application Priority Data

Apr. 16, 2021 (JP) ................. 2021-069909

(51) Int. Cl.
*H04N 25/627* (2023.01)
*H04N 25/62* (2023.01)
(Continued)

(52) U.S. Cl.
CPC ........... *H04N 25/627* (2023.01); *H04N 25/62* (2023.01); *H04N 25/77* (2023.01)

(58) Field of Classification Search
CPC ...... H04N 25/77; H04N 25/62; H04N 25/627; H04N 25/76
See application file for complete search history.

(56) References Cited

U.S. PATENT DOCUMENTS

| | | | |
|---|---|---|---|
| 2007/0023788 A1* | 2/2007 | Yasui | H10F 39/803 257/239 |
| 2009/0009635 A1* | 1/2009 | Maeda | H04N 25/78 348/241 |
| 2021/0143193 A1* | 5/2021 | Takizawa | H04N 25/70 |

FOREIGN PATENT DOCUMENTS

| | | |
|---|---|---|
| JP | 2007036916 A | 2/2007 |
| JP | 2008283557 A | 11/2008 |

OTHER PUBLICATIONS

International Search Report (PCT/ISA/210), International Application No. PCT/JP2022/015266, dated Jun. 21, 2022.

* cited by examiner

*Primary Examiner* — Marly S Camargo
(74) *Attorney, Agent, or Firm* — Michael Best & Friedrich LLP

(57) ABSTRACT

[Problem] An excessive amount of light received by an image sensor is detected with high accuracy without increasing the circuit scale.
[Solution] An imaging apparatus includes a pixel, unit including a photoelectric conversion element and a first transistor that outputs a signal photoelectrically converted by the photoelectric conversion element to a signal line; and an excessive light amount detection circuit that detects that the photoelectric conversion element receives an excessive amount of light. The excessive light amount detection circuit includes a second transistor and a capacitor that are connected in series between the signal line and a reference potential node; and a dummy circuit that adjusts a gate (Continued)

voltage of the second transistor in consideration of at least one of fluctuations in a voltage level of a power supply voltage, a parasitic resistance of the signal line, and variations in a threshold voltage of the first transistor.

20 Claims, 22 Drawing Sheets

(51) Int. Cl.
*H04N 25/76* (2023.01)
*H04N 25/77* (2023.01)

IMAGING APPARATUS AND ELECTRONIC DEVICE

TECHNICAL FIELD

The present disclosure relates to an imaging apparatus and an electronic device.

BACKGROUND ART

An image sensor may incorrectly identify pixels that should be white as black, for example, when receiving extremely high brightness light such as sunlight, resulting in an abnormal output called a sunspot in the captured image.

In this respect, there is an image sensor equipped with a comparator circuit that compares the potential of a vertical signal line for reading a signal charge photoelectrically converted from each imaging pixel with a predetermined threshold value to detect an excessive amount of light received (see, for example, PTL 1).

CITATION LIST

Patent Literature

[PTL 1]
JP 2008-283557A

SUMMARY

Technical Problem

However, in such an image sensor that uses a comparator circuit to detect an excessive amount of light received, the comparator circuit needs to be provided for each column of imaging pixels arranged in a matrix. In addition, comparison accuracy is required for abnormality detection. Thus, a large-scale comparator circuit is required, resulting in a circuit with increased scale.

Therefore, the present disclosure provides an imaging apparatus and an electronic device that can detect an excessive amount of light received by an image sensor with high accuracy without increasing the scale of the circuit.

Solution to Problem

In order to solve the above problems, an imaging apparatus according to the present disclosure is provided, including: a pixel unit including a photoelectric conversion element and a first transistor that outputs a signal photoelectrically converted by the photoelectric conversion element to a signal line; and an excessive light amount detection circuit that detects that the photoelectric conversion element receives an excessive amount of light,
  the excessive light amount detection circuit including
    a second transistor and a capacitor that are connected in series between the signal line and a reference potential node, and
    a dummy circuit that adjusts a gate voltage of the second transistor in consideration of at least one of fluctuations in a voltage level of a power supply voltage, a parasitic resistance of the signal line, and variations in a threshold voltage of the first transistor.
The dummy circuit may include
  a dummy pixel unit including a first dummy transistor corresponding to the first transistor and a dummy signal line connected to the first dummy transistor, and a second dummy transistor that controls the gate voltage of the second transistor according to a potential of the dummy signal line.

The gate voltage of the second transistor may be controlled such that the parasitic resistance of the signal line and a parasitic capacitance of the dummy signal line are equal.

The second dummy transistor and the second transistor may form a current mirror circuit.

The first dummy transistor may have the same size, the same conductivity type, and the same electrical characteristics as the first transistor, and The second dummy transistor may have the same size, the same conductivity type, and the same electrical characteristics as the second transistor.

A pixel array unit may be included, including a plurality of pixel units arranged in a first direction and a second direction that intersect with each other, the dummy pixel unit may be provided in association with two or more of the pixel units arranged in the first direction in the pixel array unit, and the second dummy transistor may be provided separately for each of two or more second transistors corresponding to the two or more pixel, units arranged in the first direction.

The dummy pixel unit may be provided in association with the two or more second transistors arranged in a same row in the second direction and in the first direction, and
  the second dummy transistor may be provided separately for each of the two or more second transistors arranged in a same row in the second direction and in the first direction.

The second dummy transistor may be arranged near the corresponding second transistor.

The dummy pixel unit may be arranged on one end side in the first direction in the pixel array unit.

The pixel array unit may have an effective pixel region and two ineffective pixel regions arranged on both sides of the effective pixel region in the first direction, and
  the dummy pixel unit may be arranged in one of the two ineffective pixel regions.

A voltage follower circuit connected between the dummy signal line and the second dummy transistor may be provided.

The pixel unit may include a third transistor connected between the first transistor and the signal line to switch whether to output a signal amplified by the first transistor to the signal line,
  the dummy circuit may include a third dummy transistor corresponding to the third transistor, and
  the third dummy transistor may be connected between the first dummy transistor and the dummy signal line.

A differential amplifier may be provided that detects a potential difference between a voltage signal corresponding to a potential of the signal line and a ramp wave signal whose voltage level changes with time, and
  the first dummy transistor may be turned on in a period for adjusting an offset voltage of the differential amplifier.

The pixel unit may have a floating diffusion that accumulates a charge photoelectrically converted by the photoelectric conversion element, and a fourth transistor that resets the charge held in the floating diffusion,
  after a first period for detecting the offset voltage of the differential amplifier, a second period may be provided for the differential amplifier to detect a potential difference between the voltage signal corresponding to the potential of the signal line and the ramp wave signal in a state where the charge in the floating diffusion is reset, and the excessive light amount detection circuit may output a signal indicating that the photoelectric conversion element receives an excessive amount of light from a connection node between the second transistor and the capacitor in the second period.

A dummy control circuit may be provided that supplies a certain voltage defining a sunspot detection level to a gate of the first dummy transistor in the first period.

The dummy control circuit may include a low dropout (LDO) circuit that generates a signal for the gate so as not to be affected by fluctuations in the voltage level of the power supply voltage.

The pixel unit may output a signal corresponding to electrons photoelectrically converted by the photoelectric conversion element to the signal line, and each of the second transistor and the second dummy transistor may be an N-type MOS transistor.

The pixel unit may output a signal corresponding to holes photoelectrically converted by the photoelectric conversion element to the signal line, and each of the second transistor and the second dummy transistor may be a P-type MOS transistor.

A signal may be output that indicates that the photoelectric conversion element receives an excessive amount of light from a connection node between the second transistor and the capacitor.

An electronic device according to the present disclosure is provided, including:
  an imaging apparatus that outputs a photoelectrically converted imaging signal; and
  a signal processing unit that performs signal processing on the imaging signal, the imaging apparatus including
  a pixel unit including a photoelectric conversion element and a first transistor that outputs a signal photoelectricaiiy converted by the photoelectric conversion element to a signal line, and
  an excessive light amount detection circuit that detects that the photoelectric conversion element receives an excessive amount of light,
  the excessive light amount detection circuit including
  a second transistor and a capacitor that are connected in series between the signal line and a reference potential node, and
  a dummy circuit that adjusts a gate voltage of the second transistor in consideration of at least one of fluctuations in a voltage level of a power supply voltage, a parasitic resistance of the signal line, and variations in a threshold voltage of the first transistor.

DESCRIPTION OF EMBODIMENTS

Hereinafter, embodiments of an imaging apparatus and an electronic device will be described with reference to the drawings. Although main components of the imaging apparatus and the electronic device will be mainly described below, the imaging apparatus and the electronic device may include components and functions that are not illustrated or explained. The following description does not exclude components or functions that are not illustrated or mentioned.

Figure 1:
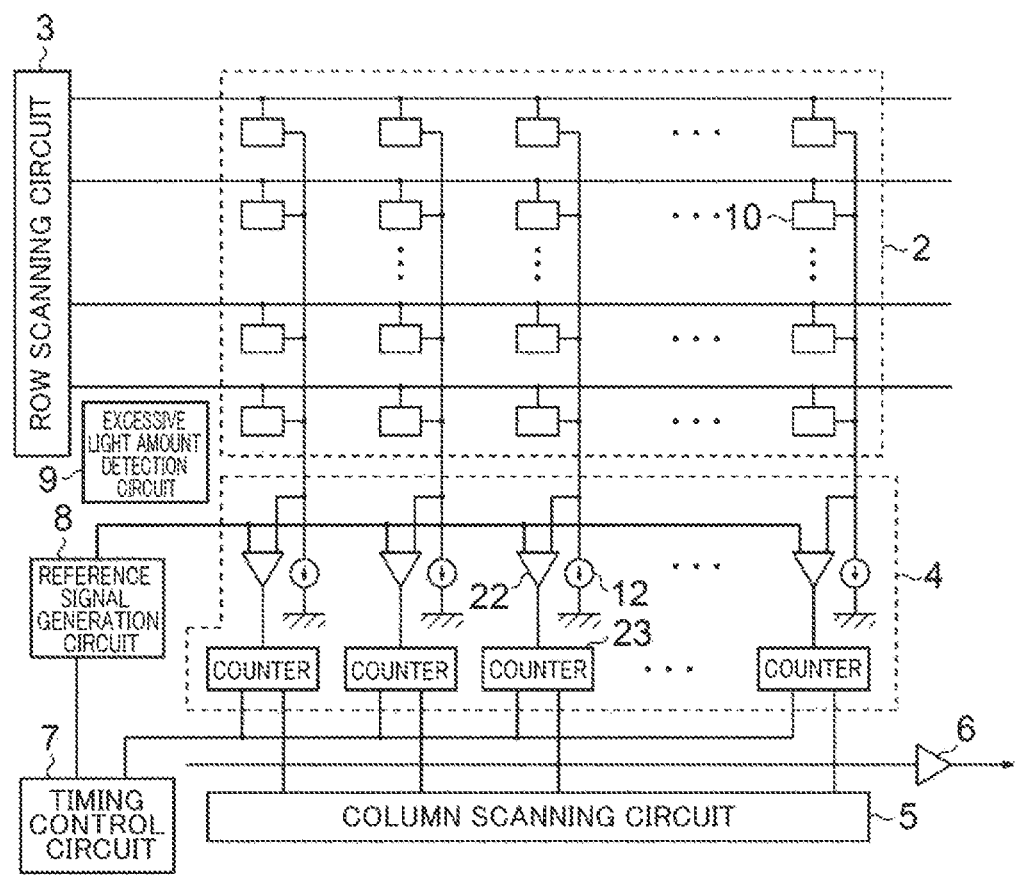
FIG. 1 is a block diagram illustrating an overview configuration of an imaging apparatus according to an embodiment.

FIG. 1 is a block diagram illustrating an overview configuration of an imaging apparatus 100 according to an embodiment. As used herein, the imaging apparatus 100 may be referred to as the image sensor 100. The imaging apparatus 100 of FIG. 1 includes an excessive light amount detection circuit 1, a pixel array unit 2, a row scanning circuit 3, an AD conversion unit 4, a column scanning circuit 5, a buffer amplifier 6, a timing control circuit 7, and a reference signal generation circuit 8.

The pixel array unit 2 includes a plurality of pixel units 10 arranged in a row direction (first direction) and a column direction (second direction). As will be described later, the pixel unit 10 includes a photoelectric conversion element and an amplifier transistor (first transistor) AMP that outputs an imaging signal photoelectrically converted by the photoelectric conversion element to a vertical signal line VSL. Hereinafter, an example will be mainly described below in which a photodiode is used as the photoelectric conversion element.

The row scanning circuit 3 sequentially drives a plurality of row selection lines arranged in the row direction. To one row selection line, a plurality of pixel units 10 arranged in the row direction are connected. Signals photoelectrically converted by the plurality of pixel units 10 connected to the driven row selection line are input to the AD conversion unit 4 via the corresponding plurality of vertical signal lines VSL.

The AD conversion unit 4 includes a plurality of comparators (differential amplifiers) 22 that compare voltage signals of the plurality of vertical signal lines VSL with ramp wave signals, and counters 23 that each count up or down according to an output signal of the corresponding comparator 22. The count value of the counter 23 is a digital signal of the photoelectrically converted imaging signal.

The column scanning circuit 5 performs control of sequentially supplying the count values of the plurality of counters 23 to the data output lines. Signals on the data output lines are output through the buffer amplifier 6.

The timing control circuit 7 controls the operation timings of the AD conversion unit 4, the column scanning circuit 5, and the reference signal generation circuit 8.

The reference signal generation circuit 8 generates a ramp wave signal as a reference signal. The ramp wave signal refers to a signal whose voltage level changes linearly with time.

The excessive light amount detection circuit 1 detects that the photodiode PD in the pixel unit 10 receives an excessive amount of light. The excessive amount of light refers to light that is much brighter than ambient light, such as sunlight. The internal configuration of the excessive light amount detection circuit 1 will be described later. When detecting that an excessive amount of light is received, the excessive light amount detection circuit 1 performs processing such as forcibly setting the output of the comparator 22 to a specific signal level, for example.

Figure 2:
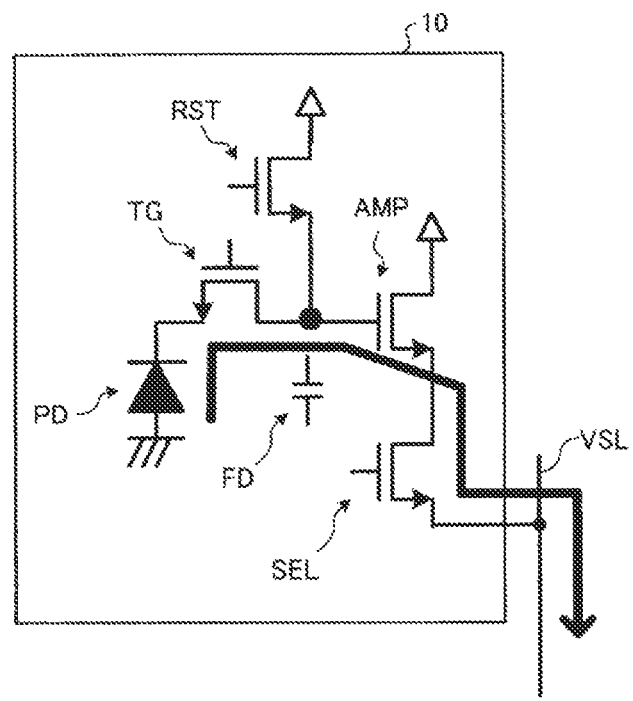
FIG. 2 is an explanatory diagram illustrating an example of a circuit configuration of an imaging unit according to the present disclosure.

FIG. 2 is a circuit diagram illustrating an example of the internal configuration of the pixel unit 10. The pixel unit 10 in FIG. 2 includes a photodiode PD, a transfer transistor TG, a reset transistor RST, an amplifier transistor AMP, and a selection transistor SEL. The source of the transfer transistor TG is connected to the cathode of the photodiode PD. The drain of the transfer transistor TG, the source of the reset transistor RST, and the gate of the amplifier transistor AMP are connected to a floating diffusion. The drain of the reset transistor RST and the drain of the amplifier transistor AMP are connected to a power supply voltage node. The source of the amplifier transistor AMP is connected to the drain of the selection transistor SEL. The source of the selection transistor SEL is connected to the vertical signal line VSL.

A transfer signal input to the gate of the transfer transistor TG, a reset signal input to the gate of the reset transistor RST, and a selection signal input to the gate of the selection transistor SEL are supplied from the row scanning circuit 3. More specifically, each row selection line in FIG. 1 includes a line for supplying a transfer signal, a line for supplying a reset signal, and a line for supplying a selection signal.

The photodiode PD accumulates a signal charge according to the amount of incident light through photoelectric conversion. When the reset transistor RST is turned on, the charge held in the floating diffusion is reset. After that, when the reset transistor RST is turned off, a certain amount of charge remains in the floating diffusion due to, for example, the effects of charge injection and accumulated charge in the reset transistor RST. This amount of charge is amplified by the amplifier transistor AMP, and supplied to the vertical signal line VSL when the selection transistor SEL is turned on. Processing of detecting a voltage corresponding to the residual charge in the floating diffusion is referred to as a P-phase.

Next, when the transfer transistor TG is turned on, the signal charge accumulated in the photodiode PD is transferred to the floating diffusion. This signal charge is amplified by the amplifier transistor AMP and supplied to the vertical signal line VSL by turning on the selection transistor SEL. Processing of detecting a voltage corresponding to the signal charge is referred to as a D-phase.

[Operation of AD Converter Circuit]

Figure 3:
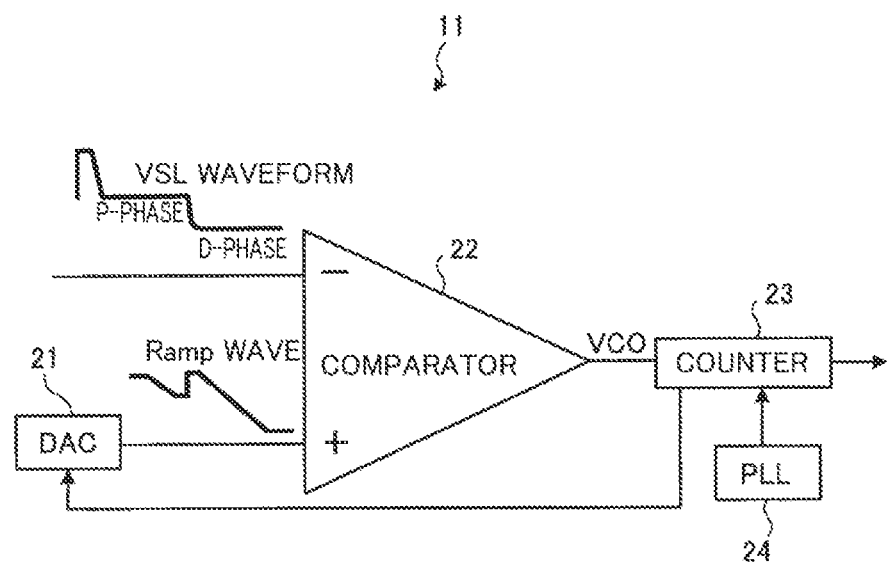
FIG. 3 is an explanatory diagram of an operation of an AD converter circuit according to the present disclosure.

Next, the configuration and operation of the AD converter circuit 11 will be described. FIG. 3 is a circuit diagram illustrating the internal configuration of the AD converter circuit 11. In the AD converter circuit, the comparator 22 and the counter 23 are provided, for each vertical, signal line VSL extending in the column direction. Each comparator 22 is supplied with a ramp wave signal generated by the reference signal generation circuit 8. The counter 23 performs a count-up or count-down operation in synchronization with a clock signal from the timing control circuit 7.

The comparator 22 compares the voltage level of the voltage signal of the corresponding vertical signal line VSL with the voltage level of the ramp wave signal, and outputs a signal indicating the comparison result. The voltage of the ramp wave signal starts to drop from the start of the P-phase. At the start of the P-phase, the ramp wave signal is set in advance such that the potential of the ramp wave signal is higher than the waveform of the P-phase potential on the vertical signal line VSL (hereinafter sometimes referred to as the VSL potential). The ramp wave signal is a signal whose voltage level decreases linearly with time.

Therefore, for a certain period of time from the start of the P-phase, the ramp wave signal has a higher potential than the VSL potential, and an output value VCO of the comparator 22 is high level accordingly. After that, when the ramp wave signal drops and falls below the VSL potential, the output value VCO of the comparator 22 turns to low level.

The counter 23 measures as a count value a time from the start of the P-phase to the occurrence of the above-described logic inversion. Through this operation, the AD converter circuit 11 converts the voltage amplitude of the VSL potential, which is an analog signal, into time information, which is a digital signal. After measuring the P-phase, the AD converter circuit 11 also measures the D-phase. As such, the AD converter circuit 11 uses the comparator 22 and the counter 23 to convert a voltage signal on the vertical signal line into a digital signal.

[Configuration of Comparator 22]

Figure 4:
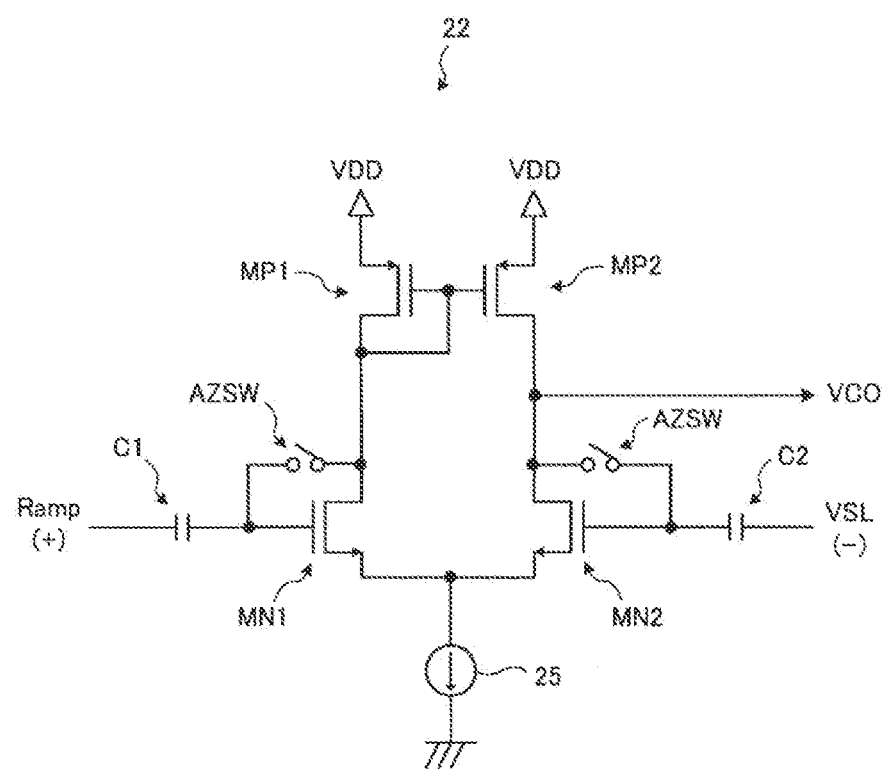
FIG. 4 is an explanatory diagram illustrating an example of a circuit configuration of a comparator according to the present disclosure.

Next, the circuit configuration and operation of the comparator 22 will be described. FIG. 4 is an explanatory diagram illustrating an example of the circuit configuration of the comparator 22.

As illustrated in FIG. 4, the comparator 22 is a differential amplifier circuit that is composed of transistors MN1 and MN2 forming a differential input stage, transistors MP1 and MP2 forming a current mirror circuit, a current source 25, auto-zero switches AZSW, a capacitor C1, and a capacitor C2.

In order to improve the accuracy of comparison between the ramp wave signal and the VSL potential, it is desirable that the output value VCO of the comparator 22 is 0 when the potential of the ramp wave signal and the VSL potential are equal.

However, in reality, an offset voltage is generated in the comparator 22 due to influences such as relative variations among and DC operating points of the transistors MN1, MN2, MP1, and MP2.

In the comparator 22, which is provided for each vertical signal line VSL, that is, for each column as illustrated in FIG. 2, abnormalities may occur such as vertical streaks in captured video due to variations in offset voltage among the vertical signal lines VSL. Thus, the offset voltage needs to be canceled.

Therefore, in the comparator 22, in a state where a reference voltage is applied to a plus terminal to which the ramp wave signal is input, and the P-phase potential is applied to a minus terminal to which the VSL potential is input, the auto-zero switches AZSW are turned on.

As a result, a voltage dropped from a power supply voltage VDD by a gate-source voltage Vgs of the transistor MP1 is applied to the terminal of the capacitor C1 on the transistor MN1 side, and the reference voltage is applied to the other terminal, of the capacitor C1. The capacitor C1 then holds the potential difference between its terminals.

Negative feedback is applied to the gate of the transistor MN2 so that the drain current of the transistor MP2 and the drain current of the transistor MN2 are equal.

Due to the negative feedback, the gate voltage of the transistor MN2 becomes a potential obtained by superimposing the remaining offset voltage which is not canceled by the negative feedback of the differential amplifier circuit on the gate voltage of the transistor MN1. This potential is applied to the terminal of the capacitor C2 on the transistor MN2 side, and the P-phase potential is applied to the other terminal. The capacitor C2 holds the potential difference between its terminals.

When the auto-zero switches AZSW are turned off in this state, a voltage corresponding to a variation from the reference potential of the ramp wave signal is applied to the gate of the transistor MN1 via the capacitor C1. On the other hand, on the vertical signal line VSL side, a voltage obtained by subtracting the offset voltage from the P-phase potential is applied to the gate of the transistor MN2, thereby canceling out the offset voltage of the differential amplifier circuit. The above operation is called auto-zero processing (hereinafter referred to as AZ processing) of the comparator 22.

The comparator 22 performs comparison with the D-phase potential after performing the AZ processing with the P-phase potential. Specifically, in the comparator 22, the differential potential between the P-phase and the D-phase is applied to the gate of the transistor MN2, so that the CDS, which is the P-phase potential-D-phase potential, is also performed. A series of operations of this AZ processing, AD conversion, and CDS is a function called single slope ADC.

[Problem]

Figure 5:
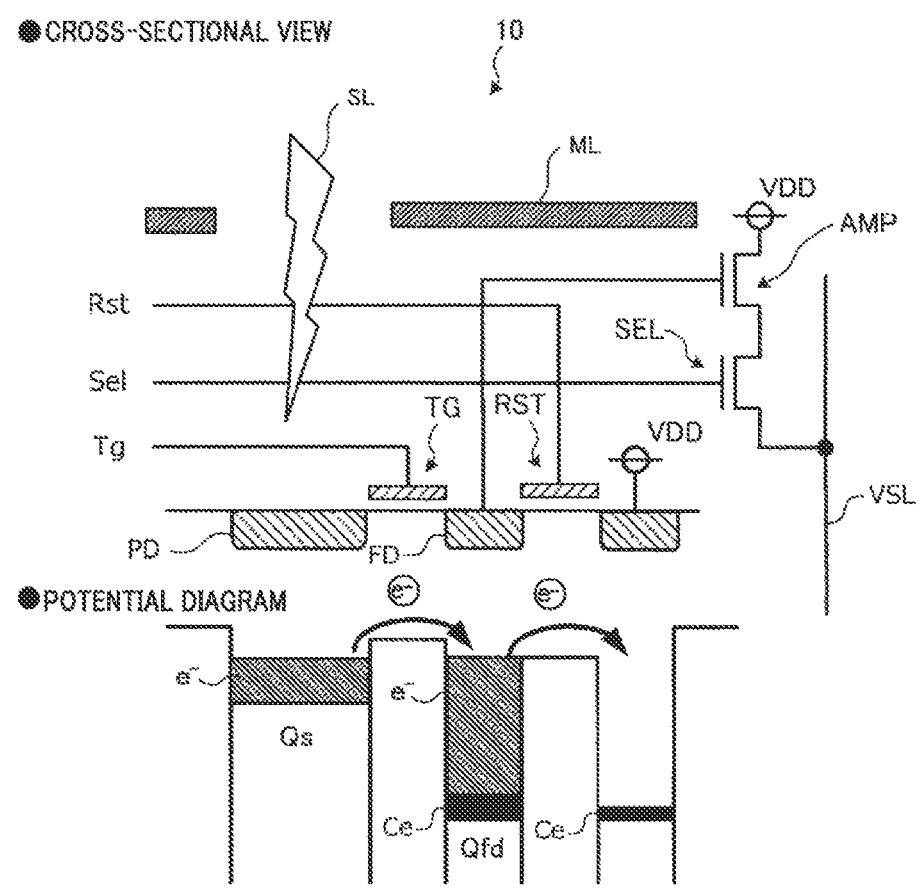
FIG. 5 is an explanatory diagram of a state of a pixel unit according to the present disclosure when receiving an excessive amount of light.
Figure 6:
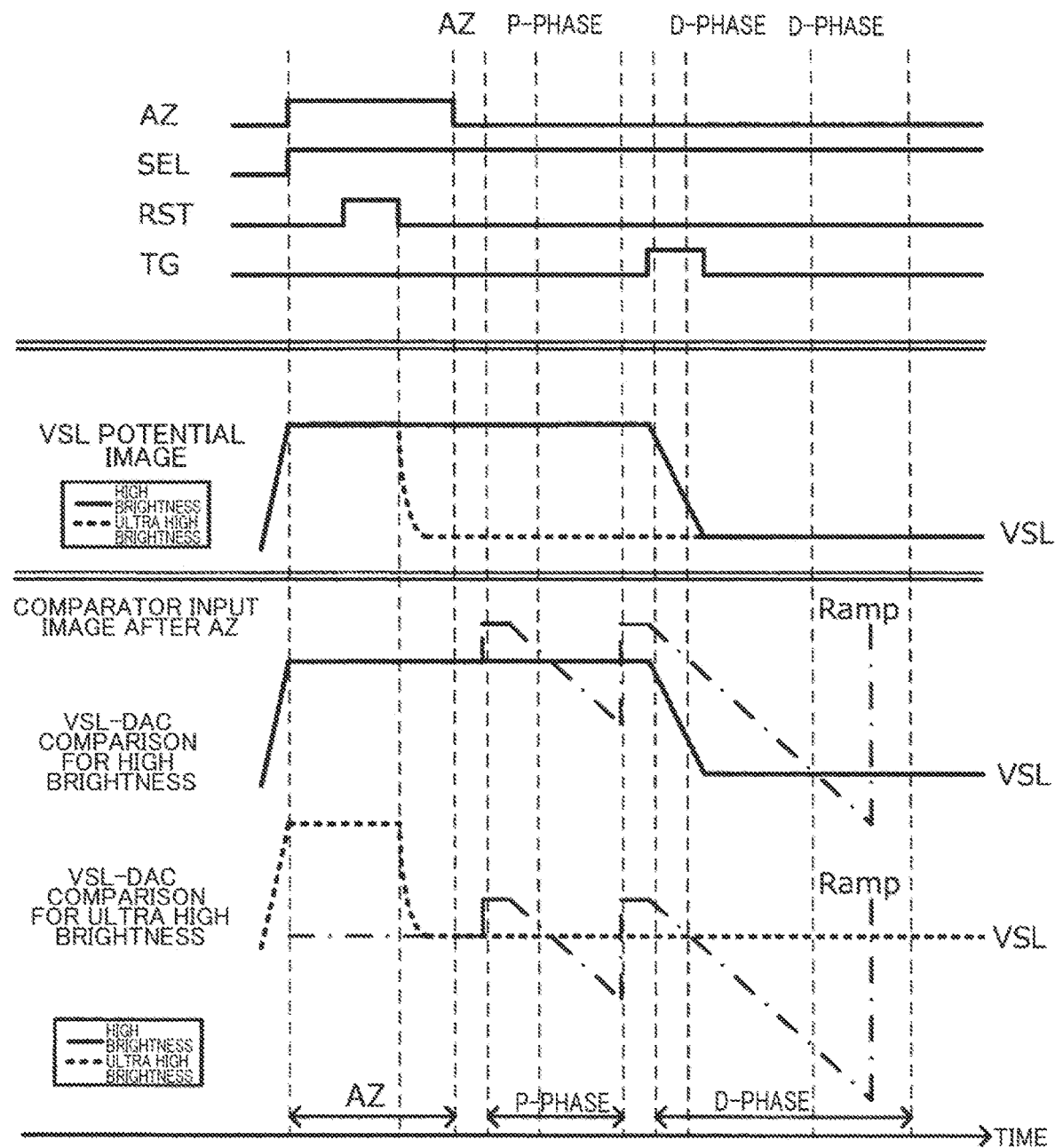
FIG. 6 is an explanatory diagram of a VSL waveform, which is a problem related to the present disclosure.

Next, a phenomenon that poses a problem for the imaging apparatus 100 will be described with reference to FIGS. 5 and 6. FIG. 5 includes a cross-sectional view of the pixel unit 10 and a potential diagram of the pixel unit 10 when receiving an excessive amount of light. FIG. 6 is a signal waveform diagram of the pixel unit 10 and the signal lines.

A period during which the auto-zero signal is high level as illustrated in FIG. 6 indicates a period during auto-zero (hereinafter referred to as the AZ period). The period during which the selection transistor SEL is high level indicates a period during which the selection transistor SEL is on. The period during which the reset transistor RST is high level indicates a period during which the reset transistor RST is on. The period during which the transfer transistor TG is high level indicates a period during which the transfer transistor TG is on.

The signal line VSL indicated, by a thick solid line in FIG. 6 indicates a VSL potential at high brightness not in the state of an excessive amount of light. The signal line VSL indicated by a dashed line indicates a VSL potential when the PD is irradiated with ultra-high-brightness light and charge exceeding Qs, which is the maximum amount of charge that can be accumulated in the photodiode PD, is generated. Ramp indicated by a dashed-dotted line indicates a ramp wave signal.

The problem described above occurs during the AZ period in the state of an excessive amount of light. As described above, the offset voltage of the comparator 22 is canceled by the P-phase potential being applied on the signal line VSL side during the AZ period. However, when intense ultra-high brightness light such as sunlight is incident on the photodiode PD, the P-phase potential may fluctuate.

Specifically, as illustrated in FIG. 5, a metal light shielding film ML is arranged on the light incident surface side of the pixel unit 10, and light SL is incident from an opening provided in the metal light shielding film ML onto the photodiode PD. Qs illustrated in FIG. 5 indicates the maximum amount of charge that can be accumulated in the photodiode PD. Qfd indicates the maximum amount of charge that can be accumulated in the floating diffusion FD.

The lower part of FIG. 5 illustrates the potential during the P-phase after the reset operation ends. The floating diffusion FD retains a charge generated by charge injection of the reset transistor RST or the like. FIG. 5 illustrates an example in which an electron is held in the floating diffusion as a charge.

In this state, when the light irradiation to the photodiode PD is strong and the charge generated by photoelectric conversion exceeds Qs, the charge exceeds the barrier of the transfer transistor TG and leaks out to the floating diffusion FD.

Of the charges held in the floating diffusion, the charges exceeding Qfd jump over the reset transistor RST and reach the power supply voltage VDD line, then recombine with holes and disappear accordingly. In other words, the amount of charge held in the floating diffusion FD continues to increase until it drops down to Qfd.

FIG. 6 illustrates a potential fluctuation of the vertical signal line VSL when this change occurs. When an amount of light that does not exceed Qs irradiates, as indicated by the thick solid line, the P-phase potential does not fluctuate, so that the AZ processing is performed normally at that potential.

After that, when the transfer transistor TG is turned on to enter the D-phase, the signal charge is transferred to the floating diffusion FD, so that the potential of the vertical signal line VSL drops. This amount of change passes through the capacitor C2 illustrated in FIG. 4 and is applied to the gate of the transistor MN2, and as a result, the CDS is performed normally.

However, when an amount of light exceeding Qs is incident, charges exceeding Qs reach the floating diffusion FD immediately after the floating diffusion FD is reset, as indicated by the dashed line for the VSL potential image. When the amount of charge in the floating diffusion FD exceeds Qfd, charge leaks out from the floating diffusion FD and the VSL potential drops accordingly. Therefore, as indicated by the dashed line for the VSL potential image in FIG. 6, the VSL potential drops during the P-phase period.

Therefore, when the transfer transistor TG is turned on in the subsequent D-phase period to read the signal charge, the VSL potential has already dropped, and thus the VSL potential does not change. Thus, the VSL potential remains the same even in the transition from the P-phase to the D-phase.

When a significantly high amount of light is incident in the AZ period, the comparator 22 will perform the AZ processing with the P-phase potential with reduced potential level.

As described, above, when a significantly high amount of light is incident, there is no potential difference between the P-phase and the D-phase, and thus the time from when the potential level of the ramp wave signal starts to drop in the P phase until it logically inverts with respect to the VSL potential, and the time from when the potential level of the ramp wave new word starts to drop in the D phase until it logically inverts with respect to the VSL potential are the same. In other words, before and after a significantly high amount of light a significantly high amount of light is incident, it is erroneously determined that the brightness of the incident light is the same. As a result, pixels that should be white under sunlight are incorrectly identified as black. This phenomenon is called sunspot.

Sunspot Countermeasure Circuit According to Comparative Example

Figure 7:
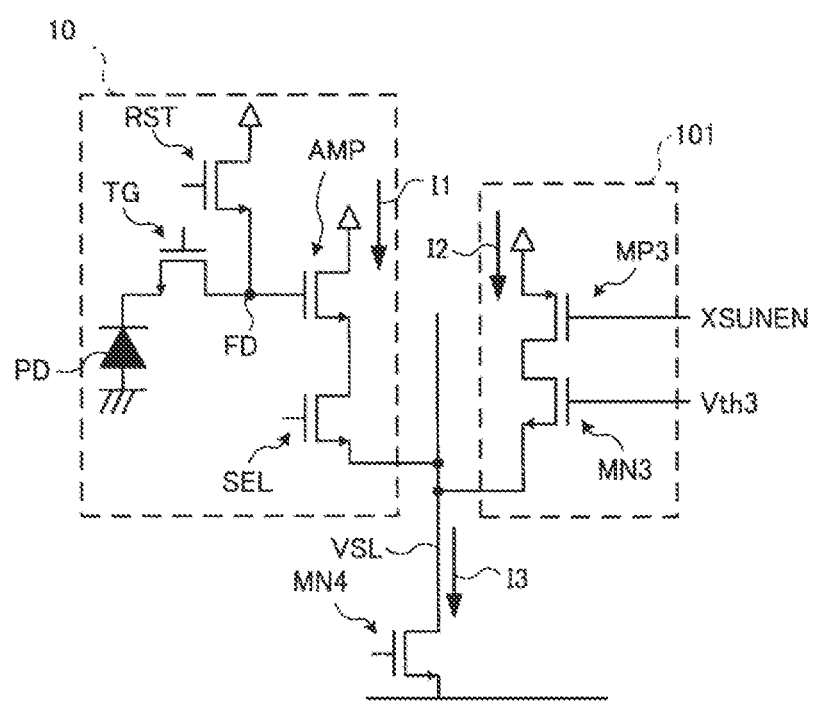
FIG. 7 is a diagram illustrating an example of a sunspot countermeasure circuit according to a comparative example of the present disclosure.
Figure 8:
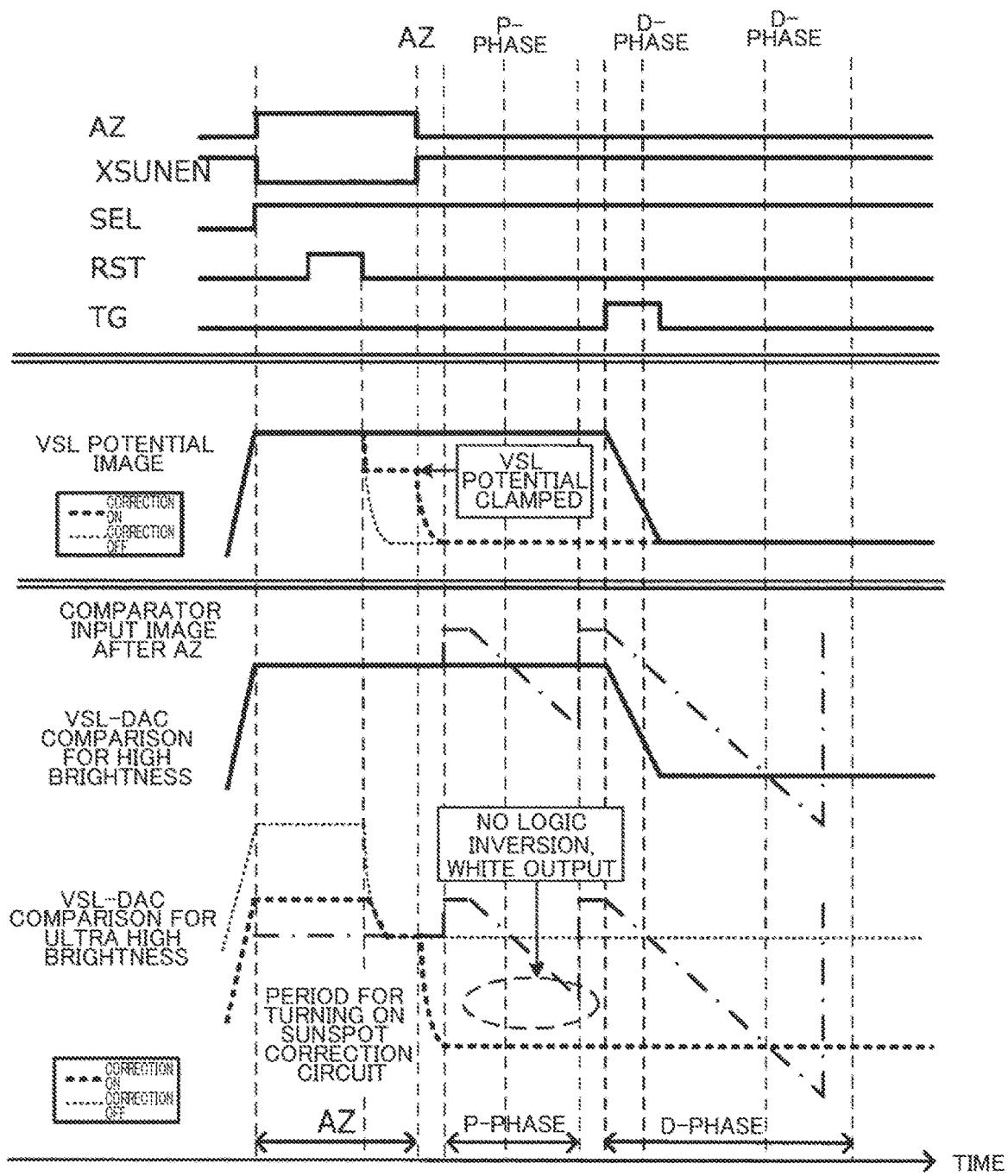
FIG. 8 is an explanatory diagram illustrating operation timings and output waveforms of the sunspot countermeasure circuit according to the comparative example of the present disclosure.

Next, a sunspot countermeasure circuit according to a comparative example for suppressing the occurrence of sunspot will be described with reference to FIGS. 7 and 8. FIG. 7 is a diagram illustrating an example of the sunspot countermeasure circuit according to the comparative example. FIG. 8 is an explanatory diagram illustrating operation timings and output waveforms of the sunspot countermeasure circuit according to the comparative example.

Among the components illustrated in FIG. 7, the components that are the same as those illustrated in FIG. 2 are given the same reference numerals as those illustrated in FIG. 2, and duplicate description thereof will be omitted here. As illustrated in FIG. 7, the sunspot countermeasure circuit according to the comparative example includes a clamp circuit 101 provided for each pixel unit 10.

The clamp circuit 101 includes a P-channel metal oxide semiconductor (MOS) transistor (hereinafter referred to as the "PMOS transistor") MP3 and an N-channel MOS transistor (hereinafter referred to as the "NMOS transistor") MN3.

The PMOS transistor MP3 has a source connected to the power supply, a drain connected to a drain of the NMOS transistor MN3, and a gate to which a predetermined gate voltage XSUNEN is applied. The NMOS transistor MN3 has a source connected to the vertical signal line VSL and a gate to which a predetermined threshold voltage Vth3 is applied.

The clamp circuit 101 sets the gate voltage XSUNEN to low level to turn on the PMOS transistor MP3 during the AZ period. When the charge in the floating diffusion FD increases due to an excessive amount of light received, the potential of the vertical signal line VSL drops.

In a state where the potential of the vertical signal line VSL does not drop to a clamp level defined by a predetermined threshold voltage Vth3, the NMOS transistor MN3 is turned off. After that, when the potential of the vertical signal line VSL drops to the potential defined by the predetermined threshold voltage Vth3, the NMOS transistor MN3 is turned on and starts operating.

Then, when the potential of the vertical signal line VSL drops to a potential at which the gate voltage of the NMOS transistor MN3 is sufficiently higher than the gate voltage of the amplifier transistor AMP, the amplifier transistor AMP is turned off.

Even when the charge in the floating diffusion FD increases any further, the potential of the vertical signal line VSL does not drop. Through this operation, the clamp circuit 101 clamps the potential of the vertical signal line VSL to the potential defined by the predetermined threshold voltage Vth3.

Figure 9:
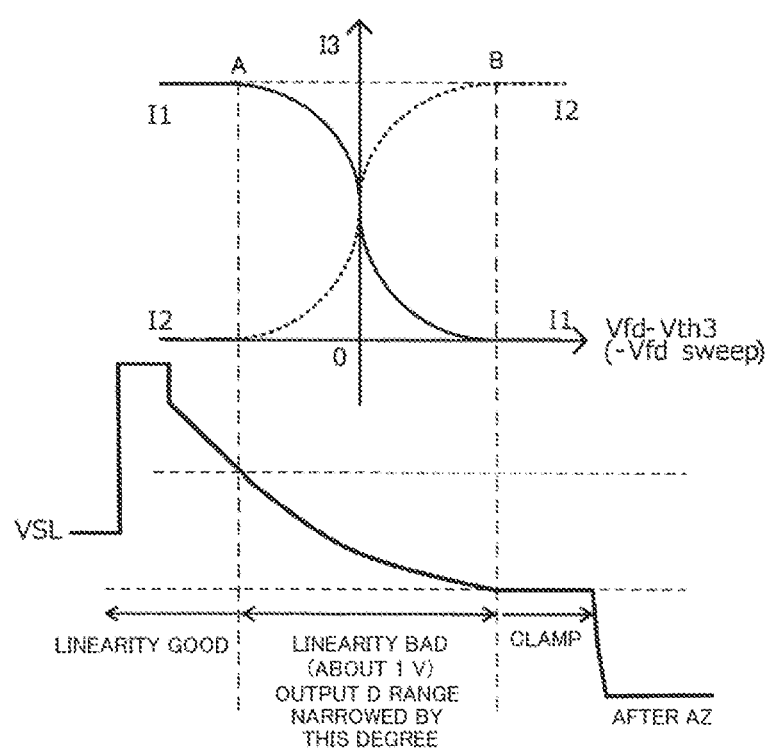
FIG. 9 is an explanatory diagram illustrating changes in current and VSL waveform when a clamp circuit according to a comparative example of the present disclosure is operated.

After the AZ period ends, the clamp circuit 101 sets the gate voltage XSUNEN to high level to turn off the PMOS transistor MP3 and therefore to turn off the NMOS transistor MN3. As a result, the amplifier transistor AMP is turned on, and the potential of the vertical signal line VSL drops as illustrated in FIG. 9, and thus to be a potential corresponding to the amount of charge in the floating diffusion FD.

As illustrated in FIG. 4, the gate voltage of the transistor MN2 fluctuates according to the fluctuation of the VSL potential after the AZ period. The predetermined threshold voltage Vth3 illustrated in FIG. 7 is set so that the gate voltage of the transistor MN2 is sufficiently low, and also so that the logic inversion of the output value VCO of the comparator 22 does not occur.

In the counter 23 illustrated in FIG. 3, when the logic inversion does not occur during P-phase counting, that is, when the count value reaches the upper limit, the corresponding pixel is identified as a sunspot, and the video signal is converted into white. As a result, the clamp circuit 101 can suppress the occurrence of sunspot.

However, the clamp circuit 101 has the following problems. A first problem is that the operation start timing of the NMOS transistor MN3 is when the difference between the gate voltage of the amplifier transistor AMP, that is, the potential of the floating diffusion FD (hereinafter referred to as "Vfd") and the threshold voltage Vth3, which is the gate voltage of the NMOS transistor MN3 is small.

The current flowing through the circuit illustrated in FIG. 7 when the clamp circuit 101 is operated will be described with reference to FIG. 9. FIG. 9 is an explanatory diagram illustrating changes in current and VSL potential when the clamp circuit 101 according to a comparative example is operated.

FIG. 9 illustrates the relationship between the above-described potential difference (Vfd−Vth3), a current I1 flowing through the amplifier transistor AMP illustrated in FIG. 7, a current I2 flowing through the NMOS transistor MN3, and the potential fluctuation of the vertical signal line VSL.

Specifically, in the upper diagram of FIG. 9, the solid line indicates the change in the current I1 with the change in the potential difference (Vfd−Vth3), and the dashed line indicates the change in the current I2. The lower diagram of FIG. 9 illustrates the potential fluctuation of the vertical signal line VSL with the change in the potential difference (Vfd−Vth3).

The potential of the vertical signal line VSL is represented by the following Equation (1). The gate-source voltage Vgs (AMP) of the amplifier transistor AMP in Equation (1) is represented by the following Equation (2). The relationship of the following Equation (3) holds among the currents I1, I2, and I3 illustrated in FIG. 7.

[Math. 1]
$$VSL = Vfd - Vgs(AMP) \quad (1)$$

[Math. 2]
$$Vgs(AMP) = \sqrt{\frac{2 \times I_1}{\frac{W}{L} \times \mu n \times Cox}} + Vth \quad (2)$$

[Math. 3]
$$I3 = I1 + I2 \quad (3)$$

The current I1 in the above equation is the drain current of the amplifier transistor AMP, W/L is the aspect ratio of the amplifier transistor AMP, μn is the carrier mobility, Cox is the gate capacitance per unit area, and Vth is the threshold voltage of the amplifier transistor AMP.

The amplifier transistor AMP and the NMOS transistor MN3 illustrated in FIG. 7 form a differential circuit, and the division ratio of the current I3 changes depending on the potential difference between the gates. Thus, when the potential difference between the gates becomes smaller, the NMOS transistor MN3 starts to flow the current I2, and the current I1 decreases accordingly (see Equation (3)).

The amplifier transistor AMP and the NMOS transistor MN4 through which the current I3 flows form a source follower. Thus, when the current I1 does not fluctuate, that is, when the gate-source voltage Vgs(AMP) does not fluctuate, the linearity of the source potential is maintained because the source potential fluctuates according to the fluctuations in the potential Vfd of the floating diffusion FD.

However, when the current I1 fluctuates, the linearity is lost (see Equations (1) and (2)) because the gate-source voltage Vgs(AMP) also changes according to the amount of fluctuation, and therefore factors other than the fluctuations in the potential Vfd of the floating diffusion FD are introduced.

Thus, the potential that can be used for the source follower is only the range where the potential Vfd of the floating diffusion FD is higher than point A illustrated in FIG. 9. The potential at which the potential of the vertical signal line VSL is clamped is point B illustrated in FIG. 9 at which the potential of the vertical signal line VSL further drops and the amplifier transistor AMP is turned off. In other words, the potential drop of the vertical signal line VSL to be clamped at point A illustrated in FIG. 9 stops only at point B, and an output D (dynamic) range of the vertical signal line VSL is narrowed by that potential (first problem).

As a countermeasure for solving the first problem, for example, there is a method of detecting a voltage drop of the vertical signal line VSL using a comparator circuit equivalent to the comparator 22. However, in order to reduce the dead zone (the range from point A to point B illustrated in FIG. 9) in the first problem, accuracy equivalent to that of the comparator 22 is required, resulting in a circuit with large scale. In addition, it is necessary to provide a circuit for detecting the voltage drop of the vertical signal line VSL for each column; this results in a problem that the scale of the circuit further increases (second problem).

As a method of clamping the potential of the vertical signal line VSL with a configuration other than the clamp circuit 101 illustrated in FIG. 7, there is a method of connecting the gate of a PMOS transistor to the vertical signal line VSL, connecting the source to the power supply, and clamping the gate-source voltage Vgs of the PMOS transistor.

However, in this method, the clamp level can be adjusted only by the gate-source voltage Vgs of the PMOS transistor. In this case, the adjustment of the clamp level is difficult because the adjustment can be performed only by the aspect ratio of the size of the PMOS transistor MP3 (third problem).

In FIG. 7, a case has been described as an example in which the pixel unit 10 is an electron sensor that detects electrons generated in photoelectric conversion. However, a case where the pixel unit 10 is a Hall sensor also has a problem. Specifically, in the case where the pixel unit 10 is an electron sensor, the clamp circuit 101 illustrated in FIG. 7 is a circuit that performs a clamp operation when the threshold voltage Vth3 exceeds the dropped potential Vfd of the floating diffusion FD.

On the other hand, in the case where the pixel unit 10 is a Hail sensor, the potential Vfd of the floating diffusion FD increases in response to an excessive amount of light. Therefore, in the clamp circuit 101, the potential of the vertical signal line VSL cannot be clamped by the NMOS transistor MN3.

Figure 10:
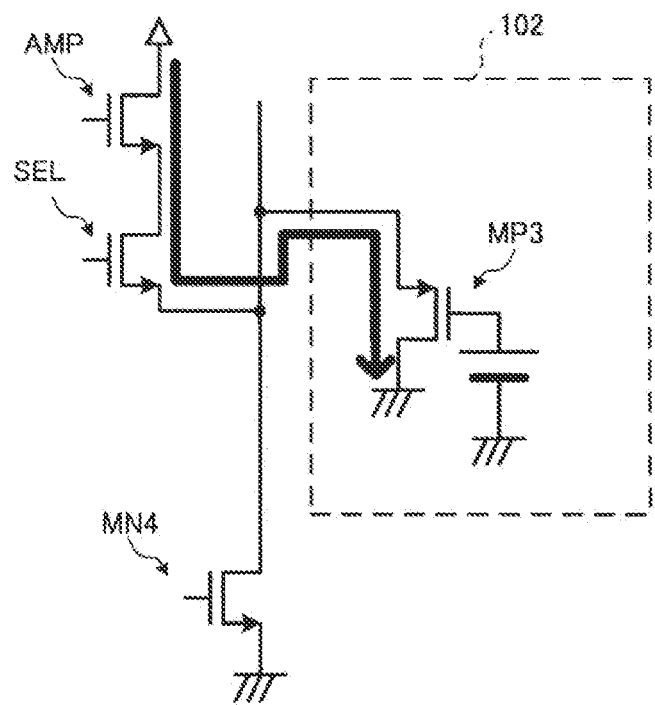
FIG. 10 is a diagram illustrating an example of another sunspot countermeasure circuit according to a comparative example of the present disclosure.

For example, it is easy to conceive of replacing the NMOS transistor MN3 with the PMOS transistor MP3, as a detection circuit 102 illustrated in FIG. 10. However, with this configuration, the amplifier transistor AMP and the PMOS transistor MP3 are short-circuited with low impedance, and a large current flows between the power supply and the ground as indicated by a thick arrow in FIG. 10. Therefore, the clamp circuit 101 according to the comparative example cannot be used for a Hall sensor (fourth problem).

[Excessive Light Amount Detection Circuit]

Therefore, to solve the first to fourth problems described above, an imaging apparatus 100 will now be discussed, including an excessive light amount detection circuit 1 that can detect an excessive amount of light received by an image sensor with high accuracy without increasing the scale of the circuit and without narrowing the output D range.

Figure 11:
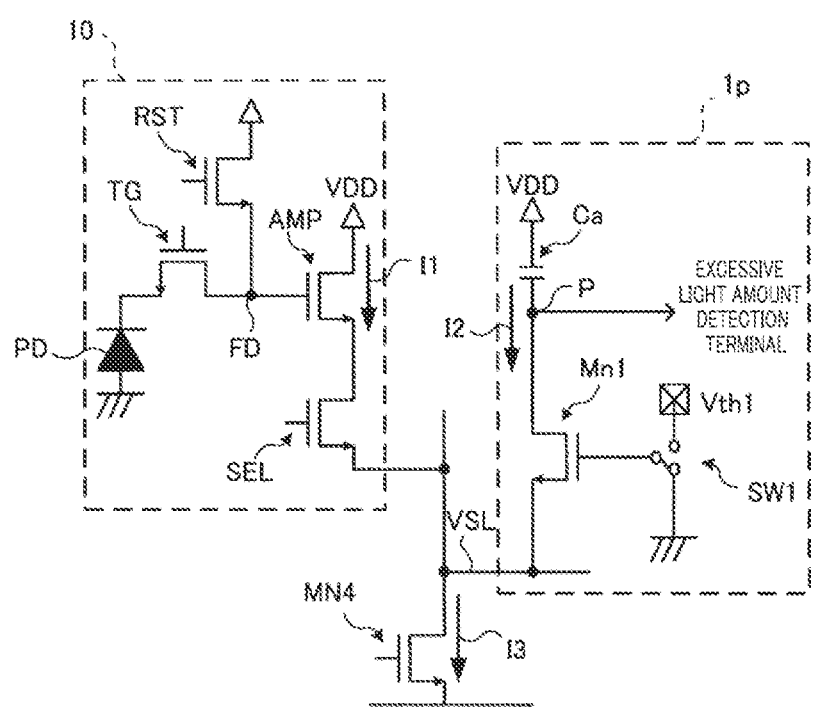
FIG. 11 is a diagram illustrating an example of an excessive light amount detection circuit according to the present disclosure.

FIG. 11 is a circuit diagram illustrating a first example of an excessive light amount detection circuit 1p. Among the components illustrated in FIG. 11, the components that are the same as those illustrated in FIG. 7 are given the same reference numerals as those illustrated in FIG. 7, and duplicate description thereof will be omitted here.

As illustrated in FIG. 11, the excessive light amount detection circuit 1p includes an NMOS transistor Mn1 and a capacitor Ca, and detects a fluctuation in the P-phase potential due to an excessive amount of light typified by sunlight. The capacitor Ca may be replaced with a resistor as long as it is a high impedance element.

The NMOS transistor Mn1 has a source connected to the vertical signal line VSL of the image sensor and a drain connected to one terminal of the capacitor Ca. The other terminal of the capacitor Ca is connected to the power supply voltage VDD line. A predetermined threshold voltage Vth1 is applied to the gate of the NMOS transistor Mn1 through a switch SW1.

The operation of the excessive light amount detection circuit 1p will now be described. The operation when the reset of the floating diffusion FD is completed and the P-phase potential is held in the floating diffusion FD to enter the AZ period will be described here. In addition, it is assumed that in the excessive light amount detection circuit 1p, the capacitor Ca is discharged in advance by a circuit (not illustrated), and the potential at a point P holds the power supply voltage VDD.

When an excessive amount of light is incident on the photodiode PD of the pixel unit 10 and the photoelectrically converted signal charge exceeds Qs and reaches the floating diffusion FD, the potential of the floating diffusion FD drops. Following this, the potential of the vertical signal line VSL also drops.

The connection node P between the capacitor Ca and the NMOS transistor Mn1 in the excessive light amount detection circuit 1p is at the power supply voltage VDD when the reset of the floating diffusion FD is completed, and no charge is accumulated in the capacitor Ca.

After that, when the potential of the vertical signal line VSL is equal to or higher than a threshold level (hereinafter referred to as the threshold voltage Vth1) defined by the gate voltage of the NMOS transistor Mn1, the NMOS transistor Mn1 is turned off, and the connection node P between the capacitor Ca and the NMOS transistor Mn1 is at the power supply voltage.

After that, when the potential of the vertical signal line VSL falls below the threshold voltage Vth1, the NMOS transistor Mn1 is turned on accordingly, and current flows through the capacitor Ca to start to accumulate charge. Accordingly, the potential of the connection node P between the capacitor Ca and the NMOS transistor Mn1 drops.

When the potential of the capacitor Ca, which drops linearly with a time constant of Q=CV=IT, drops to a potential at which there is no potential difference between the drain and source of the NMOS transistor Mn1, the NMOS transistor Mn1 enters triode operation and current decreases, and finally the current becomes zero.

In this way, in the excessive light amount detection circuit 1p, when the pixel unit 10 receives an excessive amount of light, the potential of the vertical signal line VSL drops to the potential defined by the threshold voltage Vth1.

At this time, when the pixel unit 10 receives an excessive amount of light, the potential at the connection point P connecting the capacitor Ca and the NMOS transistor Mn1 transitions from high level to low level.

Therefore, the excessive light amount detection circuit 1p transmits the potential at the connection point P as the result of detecting the excessive amount of light from an excessive light amount detection terminal to a subsequent circuit to notify that the P-phase potential has fluctuated due to the excessive amount of light. This makes it possible to perform the processing of converting the video signal of the corresponding pixel into white, regardless of subsequent operations.

After the AZ period, the excessive light amount detection circuit 1p connects the gate voltage of the NMOS transistor Mn1 to the ground through the switch SW1 to end the detection, and then returns to normal operation. As a result, the excessive light amount detection circuit 1p turns off the NMOS transistor Mn1 during the P-phase period and the D-phase period in which the P-phase potential or the D-phase potential is supplied via the vertical signal line VSL. Thus, in normal operation in which the P-phase potential does not fluctuate, the signal transmission is not affected.

[Examination of Problems]

Figure 12:
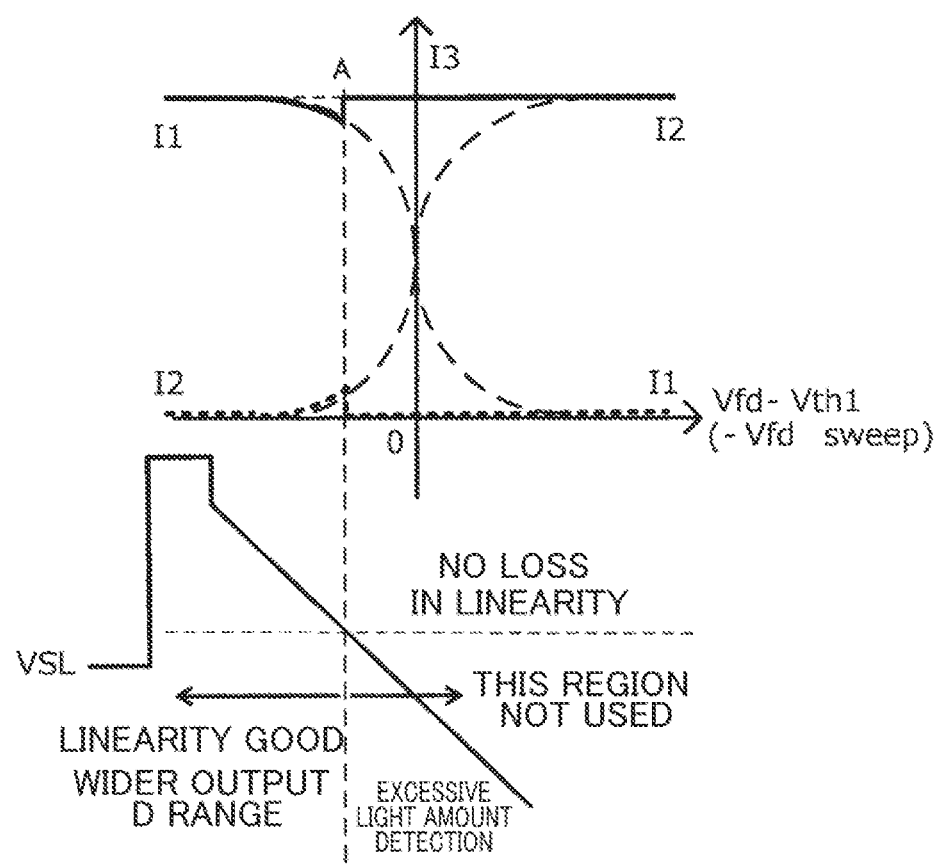
FIG. 12 is an explanatory diagram illustrating changes in current and VSL waveform when the excessive light amount detection circuit according to the present disclosure is operated.
Figure 13:
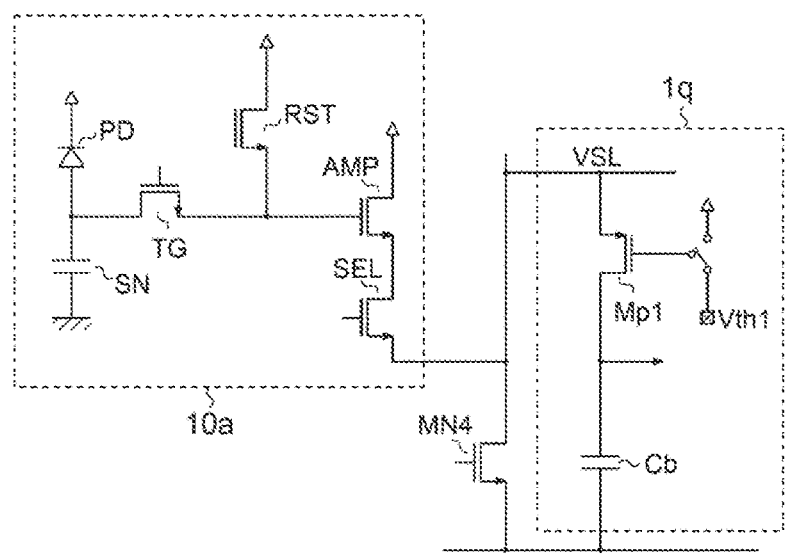
FIG. 13 is a diagram illustrating an example of an excessive light amount detection circuit that detects using a Hall sensor an excessive amount of light received, according to the present disclosure.

Next, the above first to fourth problems will be discussed with reference to FIGS. 12 and 13. FIG. 12 is an explanatory diagram illustrating changes in current and VSL potential when the excessive light amount detection circuit 1p is operated. FIG. 13 is a diagram illustrating an example of an excessive light amount detection circuit 1q that detects using a Hall sensor an excessive amount of light received. A pixel unit 10a of FIG. 13 includes a photodiode PD and a capacitor SN that are connected in series between a power supply voltage node and a ground node. The anode of the photodiode PD is connected to the drain of the transfer transistor TG. The cathode of the photodiode PD is connected to the power supply voltage node, and the photodiode PD is in a reverse bias state. When the transfer transistor TG is turned on, charges (holes) accumulated in the capacitor SN move to the floating diffusion FD in a capacity-divided manner of the capacitor SN and the floating diffusion FD, which are connected in parallel. In other words, the charges (holes) accumulated in the capacitor SN are divided and held by the capacitor SN and the floating diffusion FD.

FIG. 12 illustrates the relationship between a potential difference (Vfd−Vth1), a current I1 flowing through the amplifier transistor AMP illustrated in FIG. 11, a current I2 flowing through the NMOS transistor Mn1, and the potential fluctuation of the vertical signal line VSL.

Specifically, in the upper part of FIG. 12, the solid line indicates the change in the current I1 with the change in the potential difference (Vfd−Vth1), and the dashed line indicates the change in the current I2. The lower part of FIG. 12 illustrates the potential fluctuation of the vertical signal line VSL with the change in the potential difference (Vfd−Vth1).

As for the first problem, as illustrated in FIG. 12, logic inversion is performed using only the current at the moment when the NMOS transistor Mn1 starts to operate, and then the current is turned off. Therefore, there is no loss in the linearity due to the inversion. The threshold level can be set to the maximum value of the output D range so that a wide output D range can be secured.

Next, as for the second problem, the excessive light amount detection circuit 1p can be composed of the NMOS transistor Mn1 and the capacitor Ca, in which the number of circuit elements is substantially the same as that of the clamp circuit 101 illustrated in FIG. 7, while there is almost no dead zone, and wide-range and highly accurate detection is possible. Next, as for the third problem, the threshold level for clamping the potential of the vertical signal line VSL can be freely adjusted by setting of the gate voltage of the NMOS transistor Mn1.

Next, as for the fourth problem, in the case where the photodiode PD is a Hall sensor, the sensing element may be a PMOS transistor Mp1 as illustrated in FIG. 13. Specifically, in the case where the photodiode PD is a Hall sensor, the excessive light amount detection circuit 1q is composed of a PMOS transistor Mp1 and a capacitor Cb. The capacitor Cb may be replaced with a resistor as long as it is a high impedance element.

The PMOS transistor Mp1 has a source connected to the vertical signal line VSL of the image sensor and a drain connected to one terminal of the capacitor Cb. The other terminal of the capacitor Cb is connected to the source of an NMOS transistor MN4. A predetermined threshold voltage Vth1 is applied to the gate of the PMOS transistor Mp1 through a switch SW1. As a result, in the case where the photodiode PD is a Hall sensor, the excessive light amount detection circuit 1q can detect an excessive amount of light with a wide output D range and high accuracy, as with the clamp circuit 101 illustrated in FIG. 7.

The excessive light amount detection circuit 1p or 1q detects an excessive amount of light received based on the potential fluctuation of the vertical signal line VSL itself. Accordingly, the excessive light amount detection circuit 1p or 1q can output a signal corresponding to a binary value indicating whether or not an excessive amount of light is received to a subsequent circuit as a result of detecting the excessive amount of light.

Therefore, the excessive light amount detection circuit 1p or 1q outputs to the counter 23 a signal indicating the result of detecting the excessive amount of light. The counter 23 stops counting when a signal indicating an excessive amount of light received is input from the excessive light amount detection circuit 1p or 1q. As a result, the image sensor 100 can prevent the occurrence of sunspot by forcibly setting to white the pixel in which an excessive amount of received light is detected.

The excessive light amount detection circuit 1p or 1q stops the comparison operation of the comparator 22 by using the signal indicating the result of detecting the excessive amount of light. The comparator 22 stops the comparison between the potential of the vertical signal line VSL and the ramp wave signal when the signal indicating an excessive amount of light received is input from the excessive light amount detection circuit 1p or 1q. As a result, the image sensor 100 can prevent the occurrence of sunspot by forcibly setting to white the pixel in which an excessive amount of received light is detected.

The image sensor 100 can prevent the occurrence of sunspot by processing the result detected by the excessive light amount detection circuit 1p or 1q in a subsequent circuit.

[Problem of Excessive Light Amount Detection Circuits 1p and 1q in FIGS. 11 and 13]

The excessive light amount detection circuits 1p and 1q illustrated in FIGS. 11 and 13 are sensitive to fluctuations in the power supply voltage, and the fluctuations in the power supply voltage may reduce the accuracy of detection of excessive light amount (first problem). More specifically, when the power supply voltage fluctuates, the voltage level of the threshold voltage Vth1 in the excessive light amount detection circuits 1p and 1q illustrated in FIGS. 11 and 13 may fluctuate. Since the threshold voltage Vth1 is generated from the power supply voltage, when the power supply voltage fluctuates, the threshold voltage Vth1 may also fluctuate. When the threshold voltage Vth1 fluctuates, the potential level at which the potential of the vertical signal line VSL is clamped fluctuates. In particular, the threshold voltage Vth1 fluctuates depending on the position of the pixel, in the pixel array unit 2, and accordingly, the accuracy of detection of an excessive amount of light may vary from pixel to pixel.

Since the magnitude of the parasitic resistance is different for each signal line in the column direction in the pixel array unit 2, the threshold voltage Vth1 fluctuates due to the difference in the parasitic resistance, and accordingly, the accuracy of detection of an excessive amount of light may vary from pixel to pixel (second problem).

The threshold voltage of the amplifier transistor AMP may fluctuate for each pixel unit 10 in the pixel array unit 2, the potential of the vertical signal line VSL fluctuates due to fluctuations in the threshold voltage of the amplifier transistor AMP, and the accuracy of detection of an excessive amount of light may vary from pixel to pixel (third problem).

Improvement Example of Excessive Light Amount Detection Circuits 1p and 1q

Figure 14:
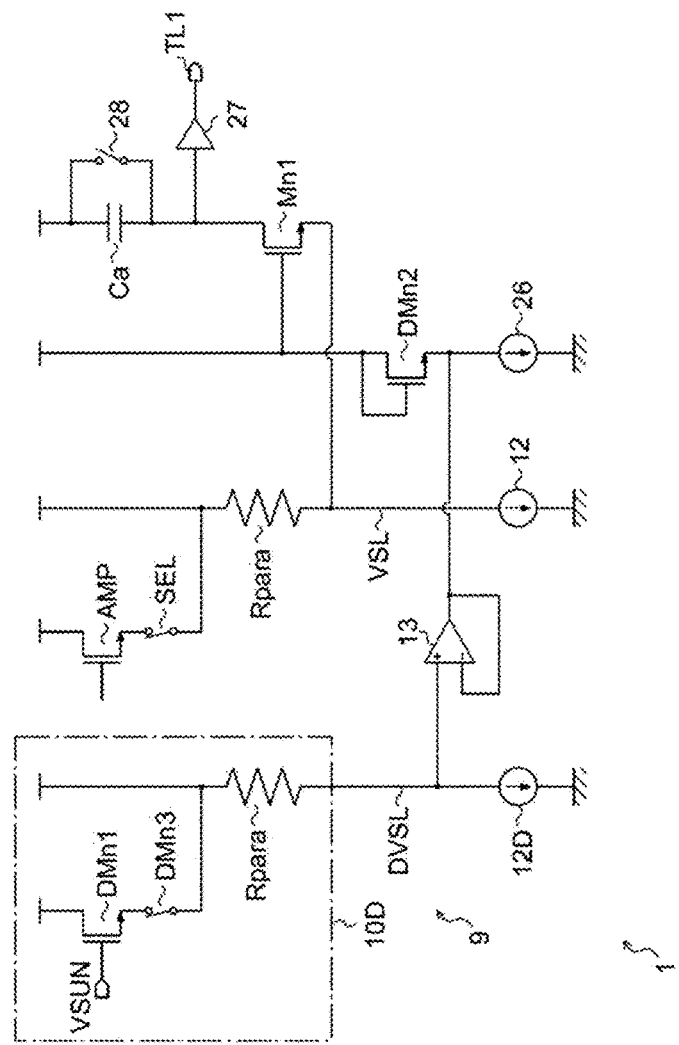
FIG. 14 is a circuit diagram of an excessive light amount detection circuit according to a first improvement example.

FIG. 14 is a circuit diagram of an excessive light amount detection circuit 1 according to a first improvement example. The excessive light amount detection circuit 1 of FIG. 14 differs in circuit configuration from the excessive light amount detection circuit 1p of FIG. 11. Specifically, the excessive light amount detection circuit 1 of FIG. 14 includes a dummy circuit 9 in addition to the NMOS transistor Mn1 and the capacitor Ca in FIG. 11.

The dummy circuit 9 adjusts the gate voltage of the NMOS transistor Mn1 in consideration of at least one of fluctuations in the voltage level of the power supply voltage, a parasitic resistance Rpara of the signal line VSL, and variations in the threshold voltage of the amplifier transistor AMP.

More specifically, the dummy circuit 9 includes a dummy pixel unit 10D and an NMOS transistor (also referred to as a second dummy transistor) DMn2. The dummy pixel unit 10D is connected to all the pixel units 10 in the same row in the pixel array unit 2, as will be described later. The second dummy transistor DMn2 is provided for each corresponding pixel unit 10. In this way, the dummy pixel unit 10D is associated with two or more pixel units 10 (typically, all the pixel units 10 in the same row) arranged in the first direction (row direction) in the pixel array unit 2. The second dummy transistor DMn2 is provided for each NMOS transistor Mn1 in each pixel unit 10. Alternatively, one second dummy transistor DMn2 may be provided for two or more NMOS transistors Mn1 in the same row.

The dummy pixel unit 10D includes a first dummy transistor DMn1 corresponding to the amplifier transistor AMP in the pixel unit 10 and a dummy signal line DVSL connected to the first dummy transistor DMn1. The first dummy transistor DMn1 has the same size, same conductivity type, and same electrical characteristics as the amplifier transistor. The second dummy transistor DMn2 has the same size, same conductivity type, and same electrical characteristics as a corresponding second transistor.

The dummy pixel unit 10D may include a third dummy transistor DMn3 corresponding to the selection transistor SEL in the pixel unit 10. The third dummy transistor DMn3 in the column selected by the row scanning circuit 3 is turned on, and the on/off of the third transistor SEL and the third dummy transistor DMn3 in the same column are synchronized. The third dummy transistor DMn3 is connected between the source of the first dummy transistor DMn1 and the dummy signal line DVSL.

A parasitic resistance Rpara of the dummy signal line DVSL connected to the dummy pixel unit 10D is the same as the parasitic resistance Rpara of the signal line VSL connected to the pixel unit 10. As a result, the gate voltage of the NMOS transistor Mn1 can be adjusted in consideration of the parasitic resistance Rpara of the signal line VSL. The first dummy transistor DMn1 in the dummy pixel unit 10D simulates the amplifier transistor AMP in the pixel unit 10, and when the threshold voltage and/or gate-source voltage of the amplifier transistor AMP fluctuate, the first dummy transistor DMn1 also fluctuates accordingly.

Similarly, when the threshold voltage and/or drain current of the NMOS transistor Mn1 fluctuate, the second dummy transistor DMn2 fluctuates accordingly.

The dummy circuit 9 provided in this way makes it possible to cancel fluctuations in the voltage level of the power supply voltage, the parasitic resistance Rpara of the signal line VSL, variations in the threshold voltage of the amplifier transistor AMP, and the like.

A large number of pixel units 10 are arranged in the row direction and the column direction in the pixel array unit 2, and the parasitic resistance Rpara of the signal line VSL differs depending on the location of the pixel unit 10. The electrical characteristics of the amplifier transistors AMP in the pixel units 10 are not always the same throughout the pixel array unit 2, and their electrical characteristics may fluctuate due to manufacturing variations. Therefore, it is desirable to provide the dummy circuit 9 for each row in the pixel array unit 2 and connect all the pixel units 10 in the same row to the same dummy circuit 9. On the other hand, it is desirable to provide the second dummy transistor DMn2 for each NMOS transistor Mn1 connected to each pixel unit 10. The second dummy transistor DMn2, which simulates the NMOS transistor Mn1, is desirably arranged near the NMOS transistor Mn1. By arranging them close to each other, the electrical characteristics of the second dummy transistor DMn2 can be made similar to the electrical characteristics of the NMOS transistor Mn1.

In FIG. 14, the parasitic resistances Rpara are illustrated on the dummy signal line DVSL and the signal line VSL. However, the parasitic resistance Rpara is not a physical resistance element, and is a general term for wiring resistance components and the like. As described above, in the excessive light amount detection circuit 1 of FIG. 14, the dummy circuit 9 is provided for each row in the pixel array unit 2. Therefore, the parasitic resistance Rpara of the dummy signal line DVSL can have approximately the same as the parasitic resistance of the signal line VSL connected to the pixel units 10 in the same row.

The dummy signal line DVSL is connected to a current source 12D that flows a current equivalent to that of a current source 12 connected to the signal line VSL. A voltage follower circuit 13 is connected to the dummy signal line DVSL. The voltage follower circuit 13 has a differential amplifier, the plus terminal of this differential amplifier is connected to the dummy signal line DVSL, and the minus terminal is connected to the output node of the differential amplifier. The output node of the differential amplifier is connected to the source of the second dummy transistor DMn2.

The voltage follower circuit 13 has a function of separating the impedances of the dummy signal line DVSL and the signal line VSL, and the provision of the voltage follower circuit 13 increases noise resistance. Since the dummy circuit 9 is provided for each row in the pixel array unit 2 and is connected to all the pixel units 10 in the same row as described above, the dummy signal line DVSL has a high impedance and is susceptible to noise. Therefore, the provision of the voltage follower circuit 13 prevents the noise of the dummy signal line DVSL from being superimposed on the signal line VSL.

The second dummy transistor DMn2 is an NMOS transistor whose gate and drain are short-circuited, and this short-circuit path is connected to the gate of the NMOS transistor Mn1. Thus, the second dummy transistor DMn2 and the NMOS transistor Mn1 form a current mirror circuit. A current source 26 is connected between the source of the second dummy transistor DMn2 and the ground node.

The signal line VSL connected to the pixel unit 10 is connected to the source of the NMOS transistor Mn1, as in FIG. 11. When an excessive amount of light is detected, the potential of the signal line VSL drops, and the gate-source voltage of the NMOS transistor Mn1 increases. When this gate-source voltage exceeds the threshold voltage of the NMOS transistor Mn1, the NMOS transistor Mn1 is turned on, the drain voltage of the NMOS transistor Mn1 drops, and accordingly, an overcurrent detection terminal connected to a connection node between the NMOS transistor Mn1 and the capacitor Ca through a buffer 27 turns to low level.

Since the NMOS transistor Mn1 and the second dummy transistor DMn2 form a current mirror circuit, the gate voltage of the NMOS transistor Mn1 has a voltage value depending on the dummy circuit 9 and the second dummy transistor DMn2. As a result, the gate voltage of the NMOS transistor Mn1 is less susceptible to variations in the threshold voltage of the amplifier transistor AMP in the pixel unit 10, the parasitic resistance Rpara of the signal line VSL, and fluctuations in the power supply voltage.

The excessive light amount detection circuit 1 of FIG. 14 operates at the same operation timings as in FIG. 8. The capacitor Ca is discharged in advance by a switch 28. When an excessive amount of light such as sunlight is incident on the photodiode PD in the AZ period, the potential of the vertical signal line VSL drops, the transistor Mn1 is turned on accordingly, and current flows through the capacitor Ca to start to accumulate charge. Accordingly, the potential of the connection node between the capacitor Ca and the transistor Mn1 drops. Then, an excessive light amount detection terminal TL1 turns from high level to low level, and when an excessive amount of light is detected, the transistor Mn1 is turned off. When the excessive light amount detection circuit 1 does not operate, the switch 28 is closed, the excessive light amount detection terminal TL1 is held at high level, and the potential of a gate signal VSUN of the dummy transistor DMn1 becomes sufficiently low. As a result, the excessive light amount detection circuit 1 makes the gate potential of the transistor Mn1 sufficiently low during the P-phase period and the D-phase period in which the P-phase potential or the D-phase potential is supplied via the vertical signal line VSL. Thus, in normal operation in the P-phase period or the D-phase period does not affect the signal transmission.

The gate signal VSUN for the first dummy transistor DMn1 in the dummy circuit 9 of FIG. 14 is generated by a dummy control circuit 29. The dummy control circuit 29 generates the gate signal VSUN for setting the gate of the first dummy transistor DMn1 to a certain potential in the AZ period. More specifically, the dummy control circuit 29 generates the gate signal VSUN so as not to be affected by fluctuations in the voltage level of the power supply voltage.

Figure 15:
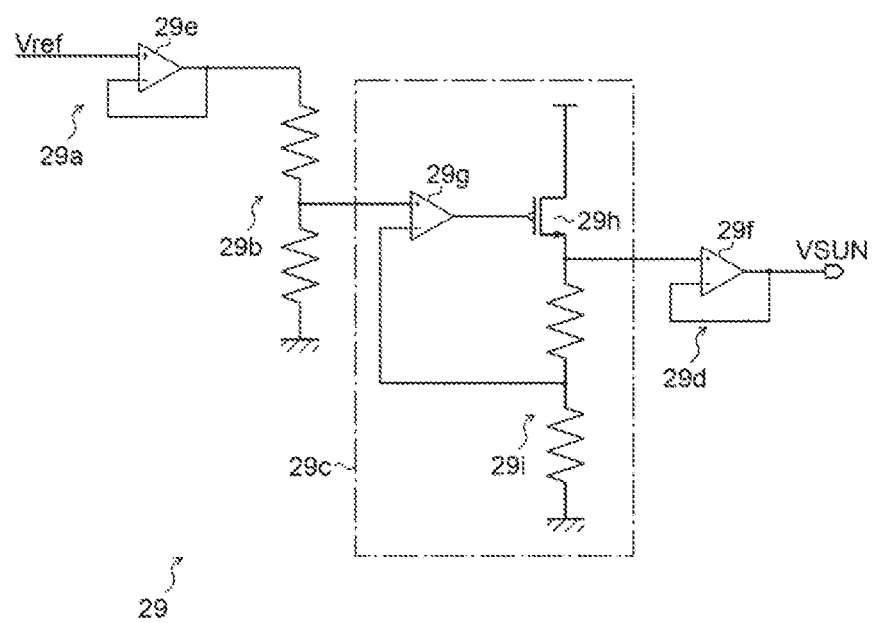
FIG. 15 is a circuit diagram illustrating an example of an internal configuration of a dummy control circuit.

FIG. 15 is a circuit diagram illustrating an example of the internal configuration of the dummy control circuit 29. The dummy control circuit 29 of FIG. 15 includes a first voltage follower circuit 29a, a first resistance voltage divider circuit 29b, a low drop-out (LDO) circuit 29c, and a second voltage follower circuit 29d.

The first voltage follower circuit 29a and the second voltage follower circuit 29d include differential amplifiers 29e and 29f that short-circuit the output node and the minus terminal, respectively, as with the voltage follower circuit of FIG. 14. A reference voltage Vref is applied to the plus terminal of the differential amplifier 29e in the first voltage follower circuit 29a, and the signal VSUN is output from the output node of the differential amplifier 29f in the second voltage follower circuit 29d. The signal VSUN is input to the gate of the first dummy transistor DMn1 in the dummy circuit 9 of FIG. 14. The signal VSUN is a signal that has a certain potential during the AZ period.

The LDO circuit 29c includes a differential amplifier 29g, a PMOS transistor 29h, and a second resistance voltage divider circuit 29i. The source of the PMOS transistor 29h is connected to the power supply voltage node, and the second resistance voltage divider circuit 29i is connected between the drain of the PMOS transistor 29h and the ground node. A voltage divided by the first resistance voltage divider circuit 29b is input to the plus terminal of the differential amplifier 29g, and a voltage divided by the second resistance voltage divider circuit 29i is inputted to the minus terminal of the differential amplifier 29g.

The LDO circuit 29c of FIG. 15 can keep the drain voltage of the PMOS transistor constant even when the voltage level of the power supply voltage fluctuates. Therefore, the voltage level of the signal VSUN output from the second voltage follower circuit 29d is not affected by fluctuations in the voltage level of the power supply voltage.

The excessive light amount detection circuit 1 of FIG. 14, which is a circuit for reading electrons photoelectrically converted by a photodiode as in FIG. 11, may have a circuit configuration for reading holes.

Figure 16:
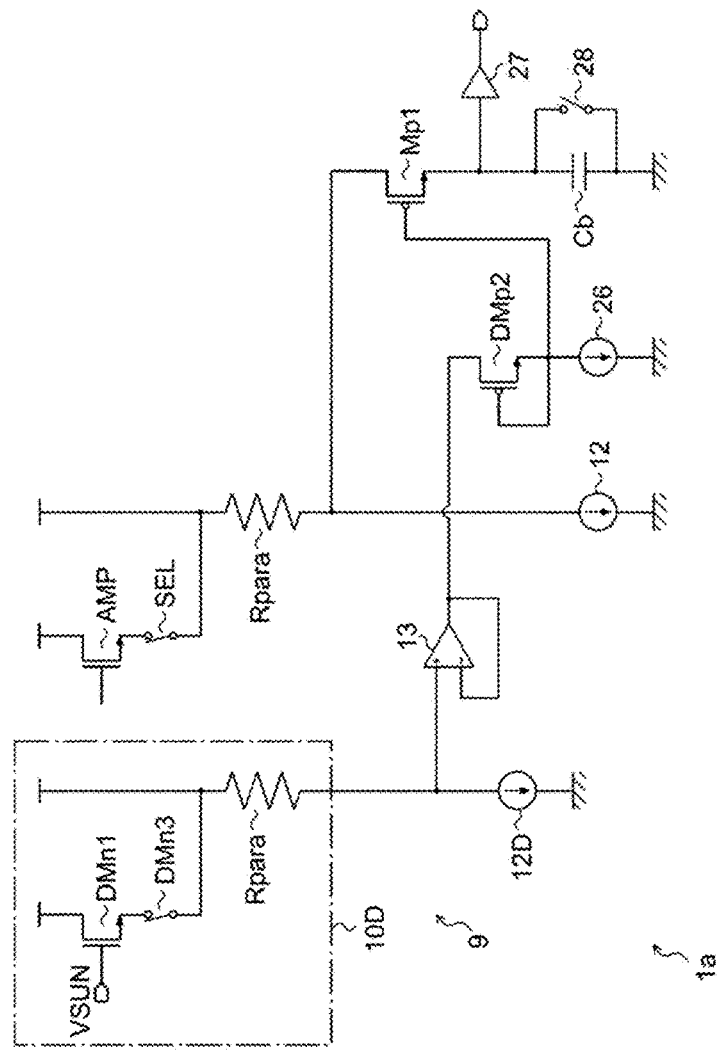
FIG. 16 is a circuit diagram of an excessive light amount detection circuit according to a second improvement example.

FIG. 16 is a circuit diagram of an excessive light amount detection circuit 1a according to a second improvement example, which is a circuit for reading holes photoelectrically converted by a photodiode. In the circuit of FIG. 16, the same components as those in FIG. 14 are designated by the same reference numerals, and differences will be mainly described below.

In the excessive light amount detection circuit 1a of FIG. 16, a PMOS transistor Mp1 and a capacitor Cb are connected in series between the signal line VSL and the ground node. An excessive light amount detection signal is output from a connection node between the PMOS transistor Mp1 and the capacitor C1 through the buffer 27.

A second dummy transistor DMp2 is a PMOS transistor whose gate and drain are short-circuited, and this short-circuit path is connected to the gate of the PMOS transistor Mp1. Thus, the second dummy transistor DMp2 and the PMOS transistor Mp1 form a current mirror circuit.

The excessive light amount detection circuits 1 and 1a of FIGS. 14 and 16 each include the dummy pixel unit 10D, the dummy signal line DVSL, and the second dummy transistor DMn2 or DMp2, which are the same configuration as the pixel unit 10, the signal line VSL, and the NMOS transistor Mn1 (or PMOS transistor Mp1) that outputs an excessive light amount detection signal. This configuration makes it possible to cancel fluctuations in the voltage level of the power supply voltage, the parasitic resistance Rpara of the signal line VSL, and variations in the threshold voltage of the amplifier transistor AMP in the pixel unit 10, and therefore to prevent sunspot from occurring with highly accurate detection of an excessive amount of light incident such as sunlight.

Figure 17:
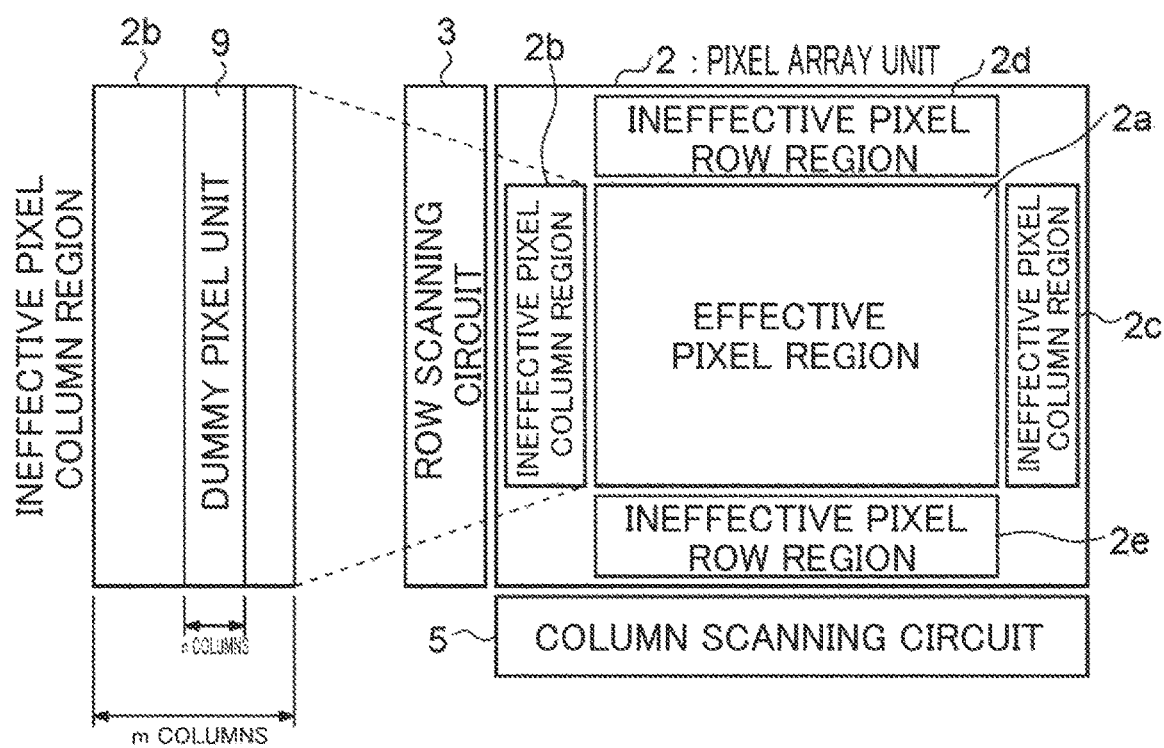
FIG. 17 is a diagram illustrating an example of arrangement of the dummy pixel unit of FIG. 14 or 16.

FIG. 17 is a diagram illustrating an example of arrangement of the dummy pixel unit 10D of FIGS. 14 and 16. The pixel array unit 2 includes an effective pixel region 2a for outputting effective pixel signals, two ineffective pixel column regions 2b and 2c arranged on both sides of the effective pixel region 2a in the column direction, and two ineffective pixel row regions 2d and 2e arranged on both sides of the effective pixel region 2a in the row direction. A row scanning circuit 3 is provided on one side or both sides of the pixel array unit 2 in the column direction.

The dummy pixel unit 10D of FIGS. 14 and 16 is arranged in one ineffective pixel row region 2b. As described above, the dummy pixel unit 10D is provided for each row and connected to all the pixel units 10 in the same row in the column direction. If the number of pixel units 10 in the column direction is large, the dummy pixel unit 10D may be provided for each set of two or more pixel units 10 in the same row to detect an excessive amount of light separately.

The second dummy transistor DMn2 is provided for each pixel, unit 10. Since the second dummy transistor DMn2 has the same electrical characteristics as the NMOS transistor (or the PMOS transistor) in the pixel unit 10, it is desirable to arrange the second dummy transistor D Mn2 near the NMOS transistor (or the PMOS transistor).

As described above, the excessive light amount detection circuits 1 and 1a of FIGS. 14 and 16 can solve the first to third problems of the excessive light amount detection circuits 1p and 1q illustrated in FIGS. 11 and 13. The excessive light amount detection circuits 1 and 1a of FIGS. 14 and 16 each include the first dummy transistor DMn1 driven by the same power supply voltage shared with the amplifier transistor AMP in the pixel unit 10, the dummy signal line DVSL having the parasitic resistance Rpara which is approximately the same as the parasitic resistance Rpara of the signal line VSL connected to the pixel unit 10, and the second dummy transistor DMn2 having the threshold voltage which is approximately the same as that of the transistor Mn1 or Mp1 connected to the signal line VSL. Then, using the second dummy transistor DMn2, the gate voltage of the transistors Mn1 or Mp1 is generated. As a result, an excessive amount of light can be detected without being affected by fluctuations in the parasitic resistance Rpara of the signal line VSL, fluctuations in the voltage level of the power supply voltage, and fluctuations in the threshold voltage of the transistor Mn1 or Mp1. Since the LDO circuit 29c is used to generate the signal VSUN that supplies a certain potential that defines the sunspot detection level to the gate of the first dummy transistor D Mn1 in the AZ period, fluctuations in the voltage level of the power supply voltage are not received.

Application Example of Excessive Light Amount Detection Circuit 1, 1a

Figure 18:
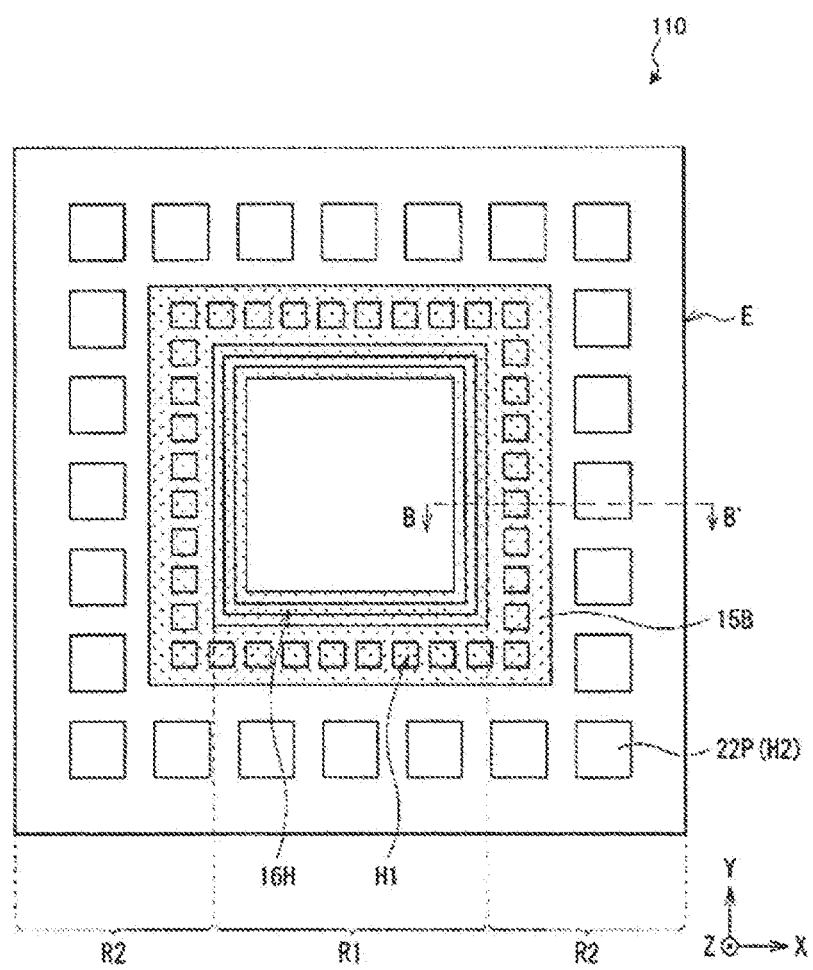
FIG. 18 is a schematic plan view illustrating an overview configuration of a light receiving element to which the excessive light amount detection circuit according to the present disclosure is applied.
Figure 19:
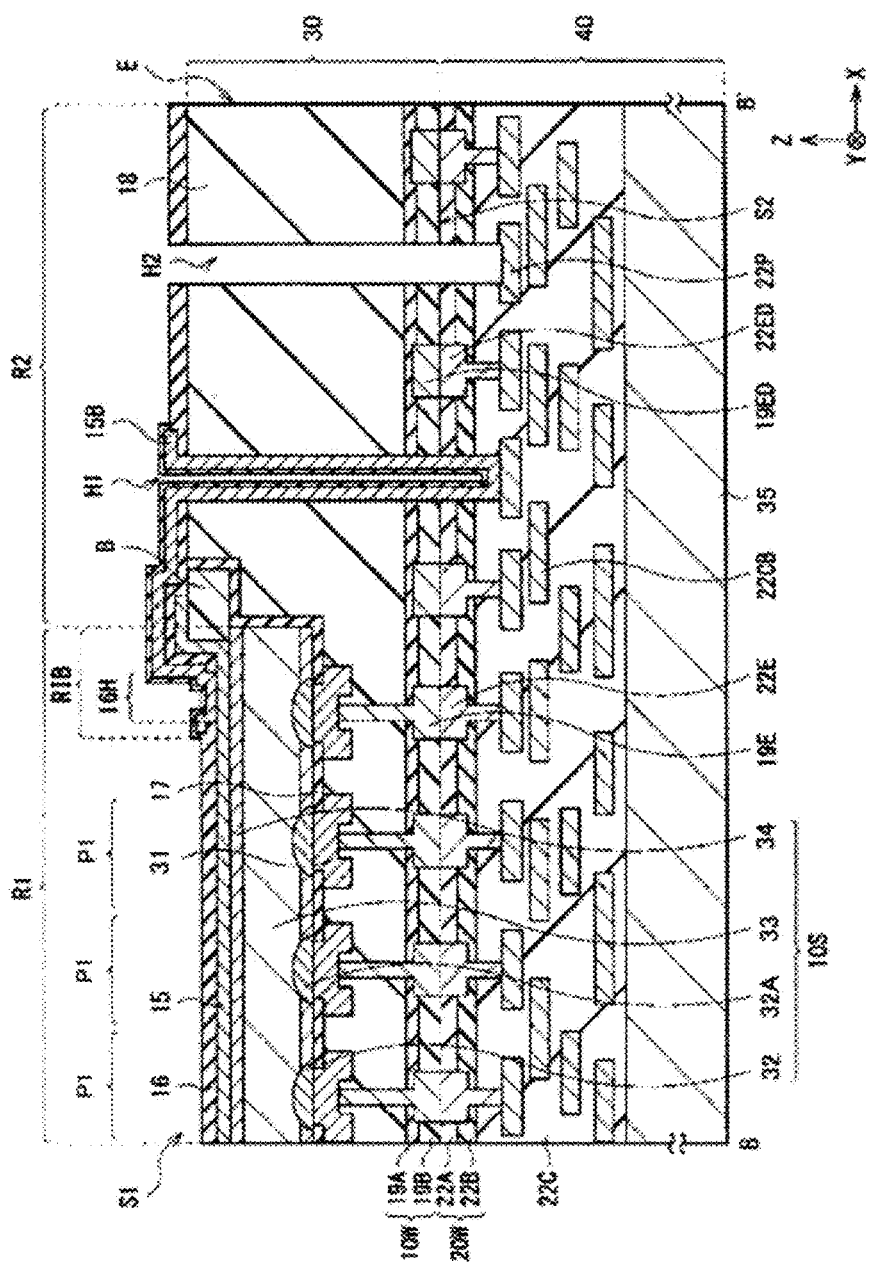
FIG. 19 is a schematic diagram illustrating a cross-sectional structure taken along a line B-B' of FIG. 14.

Next, a light receiving element to which the excessive light amount detection circuit 1 or 1a according to the present disclosure is applied will be described with reference to FIGS. 18 and 19. FIGS. 18 and 19 illustrate a schematic configuration of a light receiving element 110 to which the excessive light amount detection circuit 1 or 1a according to the present disclosure is applied. FIG. 18 indicates a planar configuration of the light receiving element 110, and FIG. 19 indicates a cross-sectional configuration taken along line B-B' of FIG. 18.

The light receiving element 110 is applied to, for example, an infrared sensor using a compound semiconductor material such as a III-V group semiconductor, and has a photoelectric conversion function for light With a wavelength in a visible region (for example, 380 nm or more and less than 780 nm) to a short infrared region (for example, 780 nm or more and less than 2400 nm). This light receiving element 110 is provided with, for example, a plurality of light receiving unit, regions P1 (pixels P1) arranged two-dimensionally (FIG. 19).

The light receiving element 110 has a central element region R1 and a peripheral region R2 provided outside the element region R1 and surrounding the element region R1 (FIG. 18). The light receiving element 110 includes a conductive film 15B provided from the element region R1 to the peripheral region R2. This conductive film 15B has an opening in a region facing the central portion of the element region R1.

The light receiving element 110 has a laminated structure in which an element substrate 30 and a readout circuit substrate 40 that is an example of a circuit board are laminated one on another (FIG. 19). One surface of the element substrate 30 is a light incident surface (light incident surface S1), and the surface opposite to the light incident surface S1 (the other surface) is a bonding surface (bonding surface S2) with the readout circuit substrate 40.

The element substrate 30 includes a wiring layer 10W, first electrodes 31, a semiconductor layer 10S (first semiconductor layer), a second electrode 15, and a passivation film 16 in this order from the readout circuit substrate 40. The surface of the semiconductor layer 10S facing the wiring layer 10W and the end surface (side surface) of the semiconductor layer 10S are covered with an insulating film 17. The readout circuit substrate 40 is a so-called readout integrate circuit (ROIC), and includes a wiring layer 20W, which is in contact with the bonding surface S2 of the element substrate 30, and a multilayer wiring layer 22C, and a semiconductor substrate 35 facing the element substrate 30 across the wiring layer 20W and the multilayer wiring layer 22C.

The element substrate 30 includes the semiconductor layer 10S in the element region R1. In other words, a region in which the semiconductor layer 10S is provided, is the element region R1 of the light receiving element 110. A region of the element region R1 exposed from the conductive film 15B (a region facing the opening of the conductive film 15B) is a light receiving region. A region of the element region R1 covered with the conductive film 15B is an optical black (OPB) region RIB. The OPB region RIB is provided so as to surround the light receiving region. The OPB region RIB is used to obtain a black level pixel signal. The element substrate 30 includes a buried layer 18 together with the insulating film 17 in the peripheral region R2. Holes H1 and H2 that penetrate the element substrate 30 and reach the readout circuit substrate 40 are provided in the peripheral region R2. In the light receiving element 110, light enters the semiconductor layer 10S from the light incident surface S1 of the element substrate 30 via the passivation film 16, the second electrode 15, and a second contact layer 14. A signal charge photoelectrically converted in the semiconductor layer 10S moves through the first electrodes 31 and the wiring layer 10W and is read out in the readout circuit substrate 40. The structure of each part will be described below.

The wiring layer 10W is provided over the element region R1 and the peripheral region P2 and has the bonding surface S2 with the readout circuit substrate 40. In the light receiving element 110, the bonding surface S2 of the element substrate 30 is provided in the element region R1 and the peripheral region 112 so that, for example, the bonding surface S2 in the element region R1 and the bonding surface S2 in the peripheral region R2 form the same plane. As will be described later, in the light receiving element 110, the bonding surface S2 in the peripheral region R2 is formed by providing the buried layer 18.

The wiring layer 10W has contact electrodes 19E and dummy electrodes 19ED in, for example, interlayer insulating films 19A and 19B. For example, the interlayer insulating film 19B is arranged on the readout circuit substrate 40 side, the interlayer insulating film 19A is arranged on a first contact layer 32 side, and these interlayer insulating films 19A and 19B are laminated one on another. The interlayer insulating films 19A and 19B are each made of, for example, an inorganic insulating material. Examples of the inorganic insulating material include silicon nitride (SiN), aluminum oxide (Al2O3), silicon oxide (SiO2), and hafnium oxide (HfO2). The interlayer insulating films 19A and 19B may be made of the same inorganic insulating material.

The contact electrode 19E is provided, for example, in the element region R1. This contact electrode 19E is for electrically connecting the corresponding first electrode 31 and the readout circuit substrate 40, and is provided for each pixel P1 in the element region R1. Adjacent contact electrodes 19E are electrically separated by the buried layer 18 and the interlayer insulating films 19A and 19B. The contact electrode 19E is formed of, for example, a copper (Cu) pad, and is exposed on the bonding surface S2. The dummy electrode 19ED is provided, for example, in the peripheral region R2. This dummy electrode 19ED is connected to a dummy electrode 22ED of the wiring layer 20W, which will be described later. By providing the dummy electrode 19ED and the dummy electrode 22ED, it is possible to improve the strength of the peripheral region R2. The dummy electrode 19ED is formed, for example, in the same process as the contact electrode 19E. The dummy electrode 19ED is formed of, for example, a copper (Cu) pad, and is exposed on the bonding surface S2.

The first electrode 31 provided between the contact electrode 19E and the semiconductor layer 10S is an electrode (anode) to which a voltage for reading out a signal charge generated in a photoelectric conversion layer 33 (holes or electrons, hereinafter for the sake of convenience, the signal charge being described to be holes) is supplied, and is provided for each pixel P1 in the element region R1. The first electrode 31 is provided so as to fill an opening of the insulating film 17, and is in contact with the semiconductor layer 10S (more specifically, a diffusion region 32A described later). The first electrode 31 is, for example, larger than the opening of the insulating film 17, and part of the first electrode 31 is provided in the buried layer 18. In other words, the upper surface (the surface on the semiconductor layer 10S side) of the first electrode 31 is in contact with the diffusion region 32A, and the lower surface and part of the side surface of the first electrode 31 are in contact with the buried layer 18. Adjacent first electrodes 31 are electrically separated by the insulating film 17 and the buried layer 18.

The first electrode 31 is made of, for example, a single material of titanium (Ti), tungsten (W), titanium nitride (TiN), platinum (Pt), gold (Au), germanium (Ge), palladium (Pd), zinc (Zn), nickel (Ni), or aluminum (Al), or an alloy containing at least one of them. The first electrode 31 may be a single film of such constituent materials, or may be a laminated film in which two or more of the constituent materials are combined. For example, the first electrode 31 is formed of a laminated film of titanium and tungsten. The thickness of the first electrode 31 is, for example, several ten nanometers to several hundred nanometers.

The semiconductor layer 10S includes, for example, the first contact layer 32, the photoelectric conversion layer 33, and a second contact layer 34 in order from the wiring layer 10W. The first contact layer 32, the photoelectric conversion layer 33, and the second contact layer 34 have the same planar shape, and their end surfaces are arranged at the same positions in plan view.

The first contact layer 32 is, for example, commonly provided for all the pixels P1 and arranged between the insulating film 17 and the photoelectric conversion layer 33. The first contact layer 32 is for electrically separating adjacent pixels P1, and for example, a plurality of diffusion regions 32A are provided in the first contact layer 32. Using for the first contact layer 32 a compound semiconductor material having a bandgap larger than that of the compound semiconductor material forming the photoelectric conversion layer 33 makes it possible to suppress dark current. For example, n-type InP (indium phosphide) can be used for the first contact layer 32.

The diffusion regions 32A provided in the first contact layer 32 are spaced apart from each other. The diffusion region 32A is arranged for each pixel P1, and the first electrode 31 is connected to each diffusion region 32A. The diffusion region 32A is also provided in the OPB region RIB. The diffusion region 32A is for reading out a signal charge generated in the photoelectric conversion layer 33 for each pixel P1, and contains p-type impurities, for example. Examples of the p-type impurities include Zn (zinc). Thus, a p-n junction interface is formed between the diffusion region 32A and the first contact layer 32 other than the diffusion region 32A, and the adjacent pixels P1 are electrically separated. The diffusion region 32A is provided, for example, in the thickness direction of the first contact layer 32 and is also provided in a part of the photoelectric conversion layer 33 in the thickness direction.

The photoelectric conversion layer 33 between the first electrode 31 and the second electrode 15, more specifically, the photoelectric conversion layer 33 between the first contact layer 32 and the second contact layer 34 is common to all the pixels P1, for example. This photoelectric conversion layer 33 absorbs light of a predetermined wavelength to generate a signal charge, and is made of, for example, a compound semiconductor material such as an i-type III-V group semiconductor. Examples of the compound semiconductor material for the photoelectric conversion layer 33 include InGaAs (indium gallium arsenide), InAsSb (indium arsenide antimony), InAs (indium arsenide), InSb (indium antimonide), and HgCdTe (mercury cadmium tellurium). The photoelectric conversion layer 33 may be made of Ge (germanium). The photoelectric conversion layer 33 is configured to, for example, perform photoelectric conversion on light with wavelengths in the visible to short infrared region.

The second contact layer 34 is provided, for example, common to all the pixels P1. This second contact layer 34 is provided between the photoelectric conversion layer 33 and the second electrode 15, and is in contact with them. The second contact layer 34 is a region where charges discharged from the second electrode 15 move, and is made of, for example, a compound semiconductor containing n-type impurities. For example, n-type InP (indium phosphide) can be used for the second contact layer 34.

The second electrode 15 is provided, for example, as an electrode common to the pixels P1, on the second contact layer 34 (light incident side) so as to be in contact with the second contact layer 34. The second electrode 15 is for discharging charges that are not used as a signal charge among the charges generated in the photoelectric conversion layer 33 (cathode). For example, when holes are read out from the first electrode 31 as a signal charge, electrons, for example, can be discharged through this second electrode 15. The second electrode 15 is formed of a conductive film that can transmit incident light such as infrared, rays. For the second electrode 15, for example, Indium Tin Oxide (ITO) or In2O3-TiO2 (ITiO) can be used. The second electrode 15 may be provided in a grid pattern, for example, so as to partition adjacent pixels P1. For this second electrode 15, a conductive material with low light transmittance can be used.

The passivation film 16 covers the second electrode 15 from the light incident surface S1 side. The passivation film 16 may have an antireflection function. For the passivation film 16, for example, silicon nitride (SiN), aluminum oxide (Al2O3), silicon oxide (SiO2), tantalum oxide (Ta2O3), and the like can be used. The passivation film 16 has an opening 16H in the OPB region RIB. The opening 161H is provided, for example, in a frame shape surrounding the light receiving region (FIG. 1q). The opening 16H may be, for example, a rectangular or circular hole in plan view. The conductive film 15B is electrically connected to the second electrode 15 in the opening 16H of this passivation film 16.

The insulating film 17 is provided between the first contact layer 32 and the buried layer 18, also covers an end face of the first contact layer 32, an end face of the photoelectric conversion layer 33, an end face of the second contact layer 34, and an end face of the second electrode 15, and is in contact with the passivation film 16 in the peripheral region R2. This insulating film 17 contains an oxide such as silicon oxide (SiOx) or aluminum oxide (Al2O3). The insulating film 17 may be formed with a laminated structure composed of a plurality of films. The insulating film 17 may be made of a silicon (Si)-based insulating material such as silicon oxynitride (SiON), carbon-containing silicon oxide (SiOC), silicon nitride (SiN), and silicon carbide (SiC). The thickness of the insulating film 17 is, for example, several ten nanometers to several hundred nanometers.

The conductive film 15B is provided, from the OPB region RIB to the hole H1 in the peripheral region R2. This conductive film 15B is in contact with the second electrode 15 in the opening 16H of the passivation film 16 provided in the OPB region R1B, and is also in contact with a wire (wire 22CB described later) of the readout circuit substrate 20 through the hole H1. This makes it possible to supply a voltage from the readout circuit substrate 40 to the second electrode 15 via the conductive film 15B. The conductive film 15B functions as a voltage supply path to such a second electrode 15, also functions as a light shielding film, and forms the OPB region RIB. The conductive film 15B is made of a metal material containing, for example, tungsten (W), aluminum (Al), titanium (Ti), molybdenum (Mo), tantalum (Ta), or copper (Cu). A passivation film may be provided on the conductive film 15B.

An adhesive layer B may be provided between an end of the second contact layer 34 and the second electrode 15. As will be described later, the adhesive layer B is used when the light receiving element 110 is formed and serves to bond the semiconductor layer 10S to a temporary substrate. The adhesive layer B is made of, for example, tetraethoxysilane (TEOS) or silicon oxide (S102). The adhesive layer B is provided, for example, beyond the end surface of the semiconductor layer 10S, and is covered with the buried layer 18 together with the semiconductor layer 10S. The insulating film 17 is provided between the adhesive layer B and the buried layer 18.

The excessive light amount detection circuits 1 and 1a are provided on the readout circuit substrate 40, when applied to the light receiving element 110. As a result, the excessive light amount detection circuits 1 and 1a can detect an excessive amount of light received by an image sensor with high accuracy without increasing the scale of the circuit for the light receiving element 110.

Figure 20:
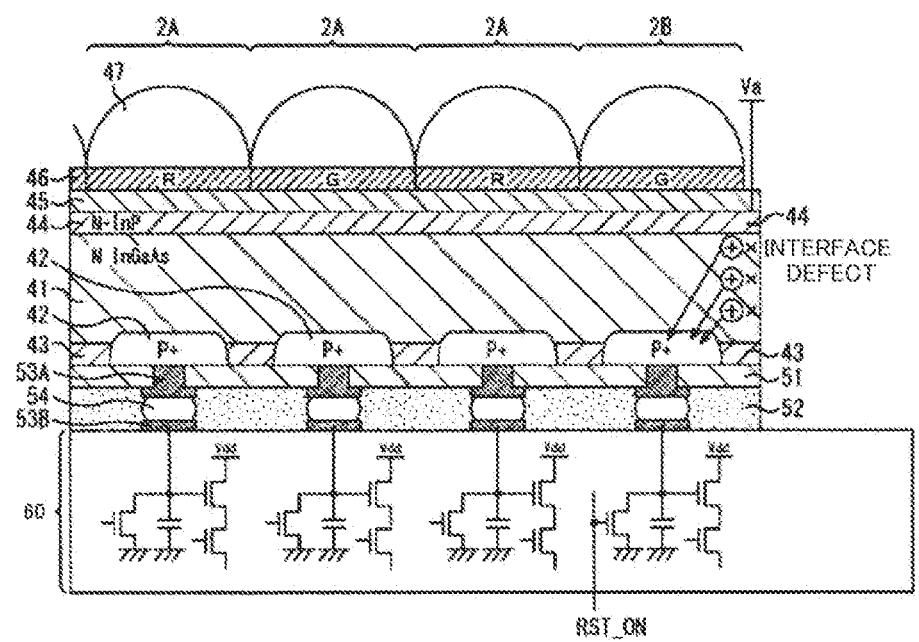
FIG. 20 is a cross-sectional view illustrating a pixel structure to which the excessive light amount detection circuit according to the present disclosure is applied.

An example of a pixel, structure to which the excessive light amount detection circuit 1 according to the present disclosure is applied will be described with reference to FIG. 20. FIG. 20 is a cross-sectional view illustrating a pixel structure to which the excessive light amount detection circuits 1 and 1a according to the present disclosure are applied.

An element substrate is provided on the upper side, which is the light incident side, of a semiconductor substrate 60, which is an example of a circuit substrate. An N-type semiconductor thin film 41 serving as a photoelectric conversion unit is formed on the element substrate over the entire surface of the pixel array region. For the N-type semiconductor thin film 41, InGaP, InAlP, InGaAs, InAlAs, or a compound semiconductor having a chalcopyrite structure may be used. The compound semiconductor having a chalcopyrite structure is a material that provides a high light absorption coefficient and high sensitivity over a wide wavelength range, and is preferably used as the N-type semiconductor thin film 41 for photoelectric conversion. Such a compound semiconductor having a chalcopyrite structure is composed of elements around IV group elements such as Cu, Al, Ga, In, S, and Se, and examples thereof include CuGaInS-based mixed crystals, CuAlGaInS-based mixed crystals, and CuAlGaInSSe-based mixed crystals.

For the material of the N-type semiconductor thin film 41, in addition to the compound semiconductors listed above, amorphous silicon (Si), germanium (Ge), a quantum dot photoelectric conversion film, an organic photoelectric conversion film, and the like can be used. In the present embodiment, an InGaAs compound semiconductor is used as the N-type semiconductor thin film 41.

A high-concentration P-type layer 42 forming a pixel electrode is formed for each pixel on the lower side, which is the semiconductor substrate 60 side, of the N-type semiconductor thin film 41. An N-type layer 43 is formed between the high-concentration P-type layers 42 formed for the pixels, serving as a pixel separation region for separating pixels, for example, made of a compound semiconductor such as InP. This N-type layer 43 has a role of preventing dark current in addition to functioning as a pixel separation region.

On the other hand, an N-type layer 44 having a higher concentration than the N-type semiconductor thin film 41 is formed also on the upper side, which is the light incident side, of the N-type semiconductor thin film 41, using a compound semiconductor such as InP used as a pixel separation region. This high-concentration N-type layer 44 functions as a barrier layer that prevents backflow of charges generated in the N-type semiconductor thin film 41. For the material of the high-concentration N-type layer 44, for example, compound semiconductors such as InGaAs, InP, and InAlAs can be used.

An antireflection film 45 is formed on the high-concentration N-type layer 44 serving as a barrier layer. Examples of the material for the antireflection film 45 include silicon nitride (SiN), hafnium oxide (HfO2), aluminum oxide (Al2O3), zirconium oxide (ZrO2), tantalum oxide (Ta2TaO), and titanium oxide (TiO2).

Either the high-concentration N-type layer 44 or the antireflection film 45 also functions as an upper electrode, which is the upper one of the electrodes sandwiching the N-type semiconductor thin film 41. A predetermined voltage Va is applied to the high-concentration N-type layer 44 or the antireflection film 45, which serves as the upper electrode.

Color filters 46 and on-chip lenses 47 are further formed on the antireflection film 45. The color filters 46 are each a filter that transmits light (wavelength light) of any one of R (red), G (green), and B (blue), and are arranged in a so-called Bayer arrangement in the pixel array unit 2.

A passivation layer 51 and an insulating layer 52 are formed on the lower side of the high-concentration P-type layer 42, which forms the pixel electrode, and the N-type layer 43, which serves as the pixel separation region. Connection electrodes 53A and 53B and bump electrodes 54 are formed so as to penetrate the passivation layer 51 and the insulating layer 52. The connection electrodes 53A and 53B and the bump electrode 54 electrically connect the high-concentration P-type layer 42 forming a pixel electrode and a capacitive element for accumulating charges.

When applied to the pixel structure illustrated in FIG. 20, the excessive light amount detection circuits 1 and 1a are provided on the semiconductor substrate 60, which is an example of a circuit substrate. As a result, the excessive light amount detection circuits 1 and 1a can detect an excessive amount of light received by an image sensor with high accuracy without increasing the scale of the circuit with the pixel structure illustrated in FIG. 20.

Application Example

The excessive light amount detection circuits 1 and 1a according to the present disclosure can be applied to various products. For example, the technology according to the present disclosure may be implemented as an apparatus mounted on any kind of mobile body such as an automobile, an electric vehicle, a hybrid electric vehicle, a motorcycle, a bicycle, a personal mobility, an airplane, a drone, a ship, a robot, a construction machine, or an agricultural machine (tractor).

Figure 21:
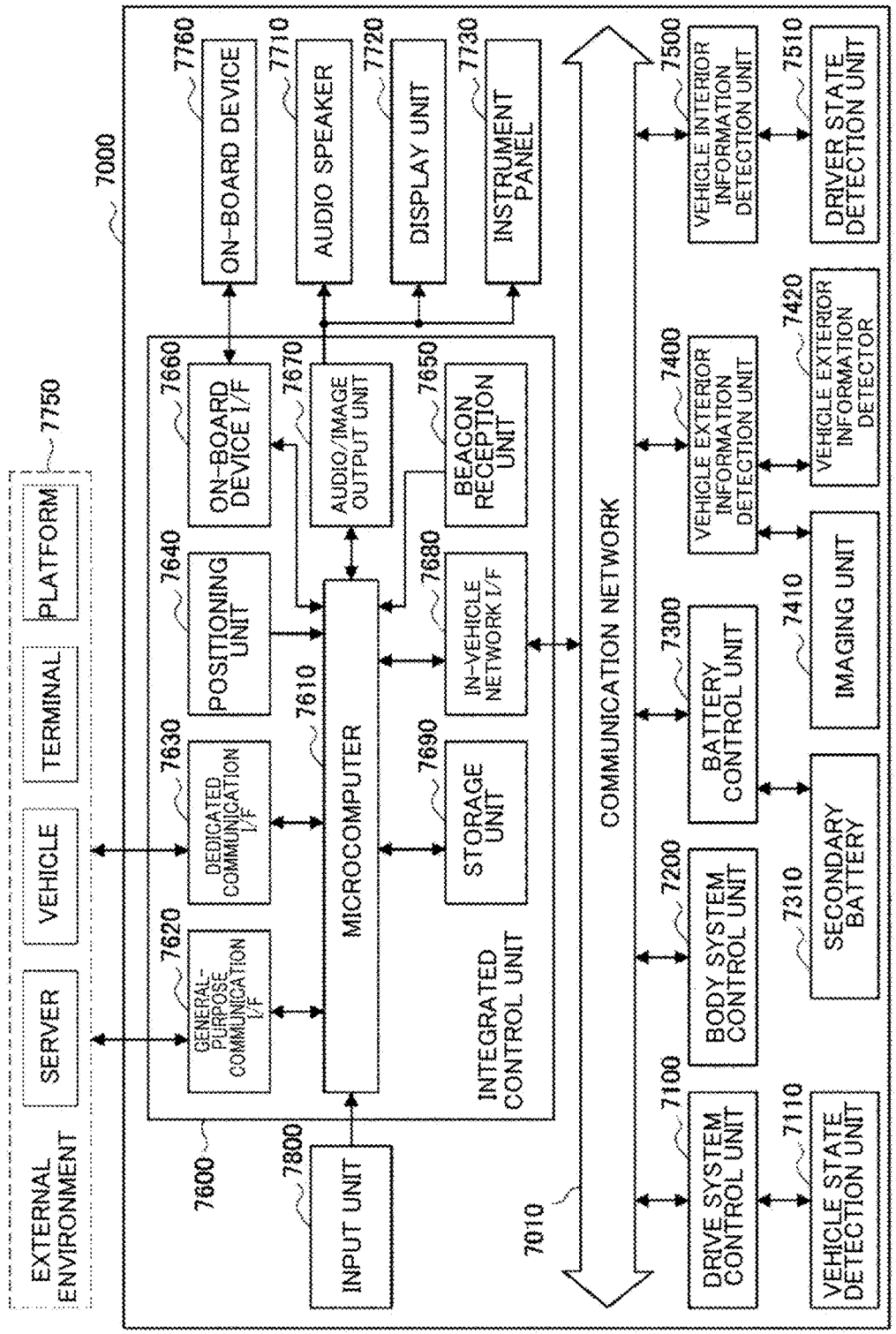
FIG. 21 is a block diagram illustrating an example of an overall configuration of a vehicle control system.

FIG. 21 is a block diagram illustrating an example of an overall configuration of a vehicle control system 7000, which is an example of a mobile control system to which the technology according to the present disclosure can be applied. The vehicle control system 7000 includes a plurality of electronic control units connected via a communication network 7010. In the example illustrated in FIG. 21, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010, which connects these control units, may be an in-vehicle communication network conforming to any standard such as, for example, Controller Area Network (CAN), Local Interconnect Network (LIN), Local Area Network (LAN), or FlexRay (registered trademark).

Each control unit includes a microcomputer that performs arithmetic processing according to various programs, a storage unit that stores programs executed by the microcomputer, parameters used for various arithmetic operations, and the like, and a drive circuit that drives various control target devices. Each control unit includes a network I/F for performing communication with other control units via the communication network 7010, and includes a communication I/F for performing communication through wired communication or wireless communication with devices, sensors, or the like inside or outside the vehicle. In FIG. 21, a microcomputer 7610, a general-purpose communication I/F 7620, a dedicated communication I/F 7630, a positioning unit 7640, a beacon reception unit 7650, an on-board device I/F 7660, an audio/image output unit 7670, an in-vehicle network I/F 7680, and a storage unit 7690 are illustrated as functional configurations of the integrated control unit 7600. The other control units also include a microcomputer, a communication I/F, a storage unit, and the like.

The drive system control unit 7100 controls operations of devices related to the drive system of the vehicle according to various programs. For example, the drive system control unit 7100 functions as a control device for a driving force generation device for generating driving force for the vehicle, such as an internal combustion engine or a drive motor, a driving force transmission mechanism for transmitting the driving force to wheels, a steering mechanism for adjusting a steering angle of the vehicle, a braking device that generates braking force for the vehicle, and the like. The drive system control unit 7100 may function as a control device such as anti-lock brake system (ABS) or electronic stability control. (ESC).

A vehicle state detection unit 7110 is connected to the drive system control unit 7100. The vehicle state detection unit 7110 includes, for example, at least one of a gyro sensor that detects an angular velocity of an axial rotation motion of a vehicle body, an acceleration sensor that detects an acceleration of a vehicle, and sensors for detecting an amount of operation with respect to an accelerator pedal, an amount of operation with respect to a brake pedal, a steering angle of a steering wheel, an engine speed, a rotation speed of wheels, and the like. The drive system control unit 7100 performs arithmetic processing using a signal input from the vehicle state detection unit 7110 to control an internal combustion engine, a drive motor, an electric power steering device, a brake device, and the like.

The body system control unit 7200 controls operations of various devices equipped in the vehicle body in accordance with various programs. For example, the body system control unit 7200 functions as a control device of a keyless entry system, a smart key system, a power window device, or various lamps such as a head lamp, a back lamp, a brake lamp, a turn indicator, and a fog lamp. In this case, radio waves emitted from a portable device in place of a key or signals of various switches can be input to the body system control unit 7200. The body system control unit 7200 receives inputs of radio waves or signals and controls a door lock device, a power window device, and a lamp of the vehicle.

The battery control unit 7300 controls a secondary battery 7310 which is a power supply source of a driving motor in accordance with various programs. For example, information such as a battery temperature, a battery output voltage, or a remaining capacity of a battery is input from a battery device including the secondary battery 7310 to the battery control unit 7300. The battery control unit 7300 performs arithmetic processing using such a signal and performs temperature adjustment control of the secondary battery 7310 or control of a cooling device equipped in the battery device.

The vehicle exterior information detection unit 7400 detects information external to the vehicle in which the vehicle control system 7000 is mounted. For example, at least one of an imaging unit 7410 and a vehicle exterior information detector 7420 is connected to the vehicle exterior information detection unit 7400. The imaging unit 7410 includes at least one of a time of flight (ToF) camera, a stereo camera, a monocular camera, an infrared camera, and other cameras. The vehicle exterior information detector 7420 includes at least one of, for example, an environmental sensor detecting present weather or atmospheric phenomena and a surrounding information detection sensor detecting other vehicles, obstacles, pedestrians, and the like around a vehicle on which the vehicle control system 7000 is mounted.

The environmental sensor may be, for example, at least one of a raindrop sensor that detects rainy weather, a fog sensor that detects fog, a sunshine sensor that detects the degree of sunshine, and a snow sensor that detects snowfall. The surrounding information detection sensor may be at least one of an ultrasonic sensor, a radar device, and a light detection and ranging or laser imaging detection and ranging (LIDAR) device. The imaging unit 7410 and the vehicle exterior information detector 7420 may be included as independent sensors or devices or may be included as a device in which a plurality of sensors or devices are integrated.

Figure 22:
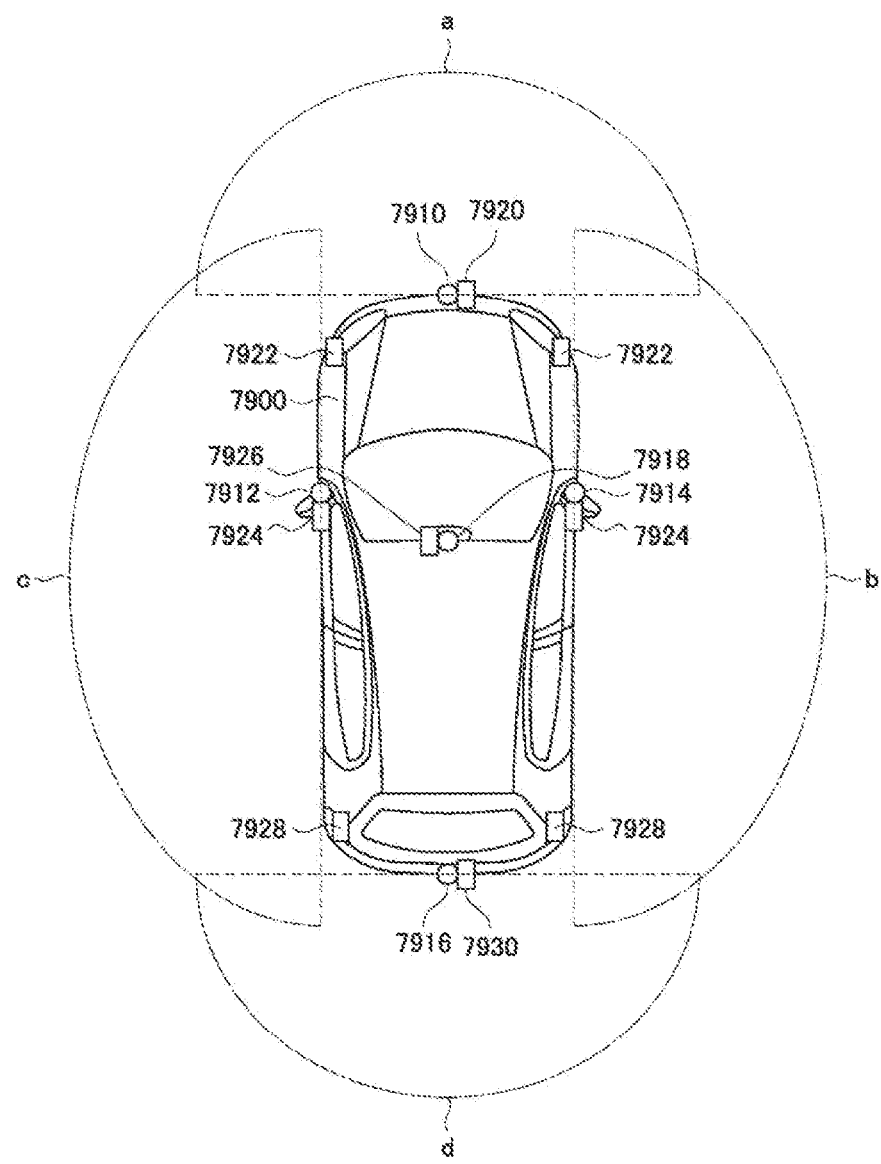
FIG. 22 is an explanatory diagram illustrating an example of positions at which vehicle exterior information detection units and imaging units are installed.

Here, FIG. 22 illustrates an example of installation positions of the imaging unit 7410 and the vehicle exterior information detector 7420. Imaging units 7910, 7912, 7914, 7916, and 7918 are provided, for example, at at least one of a front nose, side mirrors, a rear bumper, a back door, and an upper part of a windshield in a vehicle cabin of a vehicle 7900. The imaging unit 7910 included in the front nose and the imaging unit 7918 included in the upper part of the windshield in the vehicle cabin mainly acquire an image in front of the vehicle 7900. The imaging units 7912 and 7914 included in the side mirrors mainly acquire images of the sides of the vehicle 7900. The imaging unit 7916 included in the rear bumper or the back door mainly acquires an image of the rear of the vehicle 7900. The imaging unit 7918 included in the upper part of the windshield in the vehicle cabin is mainly used for detection of a preceding vehicle, a pedestrian, an obstacle, a traffic light, a traffic sign, a lane, or the like.

In FIG. 22, an example of shooting ranges of the respective imaging units 7910, 7912, 7914, and 7916 is illustrated. An imaging range a indicates an imaging range of the imaging unit 7910 provided on the front nose, imaging ranges b and c indicate imaging ranges of the imaging units 7912 and 7914 provided on the side mirrors, and an imaging range d indicates an imaging range of the imaging unit 7916 provided on the rear bumper or the back door. For example, a bird's-eye view image of the vehicle 7900 as viewed from above can be obtained when the image data captured by the imaging units 7910, 7912, 7914, and 7916 are superimposed.

Vehicle exterior information detectors 7920, 7922, 7924, 7926, 7928, and 7930 provided in a front, a rear, a side, a corner, and an upper part of the windshield in the vehicle cabin of the vehicle 7900 may be, for example, ultrasonic sensors or radar devices. The vehicle exterior information detectors 7920, 7926, and 7930 provided at the front nose, the rear bumper, the back door, and the upper part of the windshield in the vehicle cabin of the vehicle 7900 may be, for example, LIDAR devices. These vehicle exterior information detectors 7920 to 7930 are mainly used for detection of a preceding vehicle, a pedestrian, an obstacle, or the like.

The description will be continued with reference to FIG. 21 again. The vehicle exterior information detection unit 7400 causes the imaging unit 7410 to capture an image of the outside of the vehicle and receives the captured image data. Further, the vehicle exterior information detection unit 7400 receives detection information from the connected vehicle exterior information detector 7420. When the vehicle exterior information detector 7420 is an ultrasonic sensor, a radar device, or a LIDAR device, the vehicle exterior information detection unit 7400 transmits ultrasonic waves, electromagnetic waves, or the like, and receives information on received reflected waves. The vehicle exterior information detection unit 7400 may perform object detection processing or distance detection processing for a person, a vehicle, an obstacle, a sign, a character on a road surface, or the like on the basis of the received information. The vehicle exterior information detection unit 7400 may perform environment recognition processing for recognizing rainfall, fog, road surface situation, and the like on the basis of the received information. The vehicle exterior information detection unit 7400 may calculate a distance to an object outside the vehicle on the basis of the received information.

Further, the vehicle exterior information detection unit 7400 may perform image recognition processing or distance detection processing for recognizing a person, a vehicle, an obstacle, a sign, a character on a road surface, or the like on the basis of the received image data. The vehicle exterior information detection unit 7400 may perform processing such as distortion correction or alignment on the received image data, and combine image data captured by the different imaging units 7410 to generate a bird's-eye view image or a panoramic image. The vehicle exterior information detection unit 7400 may perform viewpoint conversion processing using the image data captured by the different imaging units 7410.

The vehicle interior information detection unit 7500 detects information inside the vehicle. For example, a driver state detection unit 7510 that detects a driver's state is connected to the vehicle interior information detection unit 7500. The driver state detection unit 7510 may include a camera that images a driver, a biological sensor that detects biological information of the driver, or a microphone that collects a sound in the vehicle cabin. The biological sensor is provided on, for example, a seat surface, a steering wheel, or the like and detects biological information of an occupant sitting on the seat or the driver holding the steering wheel. The vehicle interior information detection unit 7500 may calculate the degree of fatigue or the degree of concentration of the driver or determine whether the driver is drowsing based on detected information input from the driver state detection unit 7510. The vehicle interior information detection unit 7500 may perform a noise cancellation process or the like on a collected sound signal.

The integrated control unit 7600 controls overall operations within the vehicle control system 7000 according to various programs. An input unit 7800 is connected to the integrated control unit 7600. The input unit 7800 is realized by a device that can be operated for input by an occupant, such as a touch panel, a button, a microphone, a switch, or a lever. Data obtained by recognizing voice input by a microphone may be input to the integrated control unit 7600. The input unit 7800 may be, for example, a remote control device using infrared rays or other radio waves, or may be an externally connected device such as a mobile phone or personal digital assistant (PDA) corresponding to an operation on the vehicle control system 7000. The input unit 7800 may be, for example, a camera, and in this case, the occupant can input information by gesture. Alternatively, data obtained by detecting a motion of a wearable device worn by the occupant may be input. Further, the input unit 7800 may include, for example, an input control circuit that generates an input signal on the basis of information input by the occupant or the like using the input unit 7800 and outputs the input signal to the integrated control unit 7600. The occupant or the like inputs various types of data to the vehicle control system 7000 or instructs a processing operation by operating the input unit 7800.

The storage unit 7690 may include a read only memory (ROM) that stores various programs that are executed by the microcomputer, and a random access memory (RAM) that stores various parameters, calculation results, sensor values, and the like. The storage unit 7690 may be realized by a magnetic storage device such as a hard disc drive (HDD), a semiconductor storage device, an optical storage device, a magneto-optical storage device, or the like.

The general-purpose communication i/F 7620 is a general-purpose communication I/F that mediates communication with various devices present in an external environment 7750. The general-purpose communication I/F 7620 may have, implemented therein, a cellular communication protocol such as global system of mobile communications (GSM) (registered trademark), WiMAX (registered trademark), long term evolution (LTE) (registered trademark), or LTE-A (LTE-Advanced), or other wireless communication protocols such as wireless LAN (also referred to as Wi-Fi (registered trademark)) or Bluetooth (registered trademark). The general-purpose communication I/F 7620 may connect to, for example, a device (for example, an application server or a control server) present on an external network (for example, the Internet, a cloud network, or a business-specific network) via a base station or an access point. The general-purpose communication I/F 7620 may use, for example, Peer-To-Peer (P2P) technology to connect to terminals (for example, terminals of the driver, pedestrians, and shops, or machine-type communication (MTC) terminals) near the vehicle.

The dedicated communication I/F 7630 is a communication I/F that supports a communication protocol designed for use in vehicles. The dedicated communication I/F 7630 may support, for example, wireless access in vehicle environment (WANE), which is a combination of IEEE 802.11p for lower layer and IEEE 1609 for higher layer, dedicated short range communications (DSRC), or standard protocols such as cellular communication protocols. The dedicated communication I/F 7630 is used to typically perform V2X communication, which is a concept involving one or more of vehicle-to-vehicle communication, vehicle-to-infrastructure communication, vehicle-to-home communication, and vehicle-to-pedestrian communication.

The positioning unit 7640 receives, for example, a GNSS signal from a global navigation satellite system (GNSS) satellite (for example, a GPS signal from a global positioning system (CGPS) satellite), executes positioning, and generates position information including a latitude, longitude, and altitude of the vehicle. The positioning unit 7640 may specify a current position by exchanging signals with a wireless access point, or may acquire position information from a terminal such as a mobile phone, PHS, or smartphone having a positioning function.

The beacon reception unit 7650 receives radio waves or electromagnetic waves transmitted from a radio station or the like installed on a road, and acquires information such as a current position, traffic jam, road closure, or required time. A function of the beacon reception unit 7650 may be included in the above-described dedicated communication I/F 7630.

The on-board device I/F 7660 is a communication interface that mediates connections between the microcomputer 7610 and various on-board devices 7760 present in the vehicle. The on-board device I/F 7660 may establish a wireless connection using a wireless communication protocol such as wireless LAN, Bluetooth (registered trademark), NFC (Near Field. Communication), or WUSB (Wireless USB). Furthermore, the on-board device I/F 7660 may establish a wired connection such as a USB (Universal Serial Bus), HDMI (registered trademark) (High-Definition Multimedia Interface), or MIL (Mobile High-definition Link) via a connection terminal (not illustrated) (and a cable if necessary). The on-board device 7760 may include, for example, at least one of a mobile device or wearable device of an occupant and an information device carried in or attached to the vehicle. Further, the on-board device 7760 may include a navigation device that searches for a route to an arbitrary destination. The on-board device I/F 7660 exchanges control signals or data signals with the on-board devices 7760.

The in-vehicle network i/F 7680 is an interface that mediates communication between the microcomputer 7610 and the communication network 7010. The in-vehicle network I/F 7680 transmits and receives signals or the like in conformity with a predetermined protocol supported by the communication network 7010.

The microcomputer 7610 of the integrated control unit 7600 controls the vehicle control system 7000 in accordance with various programs based on information acquired through at least one of the general-purpose communication I/F 7620, the dedicated communication I/F 7630, the positioning unit 7640, the beacon reception unit 7650, the on-board device I/F 7660, and the in-vehicle network I/F 7680. For example, the microcomputer 7610 may calculate control target values for the driving force generator, the steering mechanism, or the braking device based on acquired information on the inside and outside of the vehicle, and output control commands to the drive system control unit 7100. For example, the microcomputer 7610 may perform cooperative control for the purpose of implementing functions of advanced driver assistance system (ADAS) including vehicle collision avoidance or impact mitigation, follow-up traveling based on inter-vehicle distance, vehicle speed maintenance driving, vehicle collision warning, vehicle lane departure warning, and the like. The microcomputer 7610 may perform coordinated control to perform automatic driving or the like in which a vehicle travels autonomously regardless of an operation of a driver by controlling the driving force generator, the steering mechanism, or the braking device, or the like based on acquired surrounding information of the vehicle.

The microcomputer 7610 may generate 3-dimensional distance information between the vehicle and objects such as surrounding structures or people based on information acquired via at least one of the general-purpose communication I/F 7620, the dedicated communication I/F 7630, the positioning unit 7640, the beacon reception unit 7650, the on-board device I/F 7660, and the in-vehicle network I/F 7680, and may generate local map information including surrounding information of a present position of the vehicle. The microcomputer 7610 may predict a danger such as collision of the vehicle, approach of a pedestrian, or entry into a traffic prohibition road based on the acquired information, and may generate a warning signal. The warning signal may be, for example, a signal for generating a warning sound or turning on a warning lamp.

The audio/image output unit 7670 transmits at least one of audio and image output signals to an output device capable of visually or audibly notifying an occupant of the vehicle or the outside of the vehicle of information. In the example of FIG. 21, an audio speaker 7710, a display unit 7720, and an instrument panel 7730 are illustrated as output devices. The display unit 7720 may include, for example, at least one of an on-board display and a head-up display. The display unit 7720 may have an augmented reality (AR) display function. The output device may be not only such a device but also another device such as a headphone, a wearable device such as a glasses-type display worn by an occupant, a projector, or a lamp. For the output device being a display device, the display device visually displays results obtained through various processes performed by the microcomputer 7610 or information received from another control unit in various formats such as text, images, tables, and graphs. For the output device being a sound output device, the sound output device converts an audio signal formed by reproduced sound data, acoustic data, or the like into an analog signal and outputs the analog signal auditorily.

In the example illustrated in FIG. 21, at least two control units connected via the communication network 7010 may be integrated as one control unit. Alternatively, each control unit may be configured of a plurality of control units. Further, the vehicle control system 7000 may include another control unit (not illustrated). In the above description, the other control unit may have some or all of functions of any one of the control units. Specifically, predetermined calculation processing may be performed by any one of the control units as long as information is transmitted and received via the communication network 7010. Similarly, a sensor or device connected to any one of the control units may be connected to the other control unit, and a plurality of control units may transmit or receive detection information to and from each other via the communication network 7010.

The present technology can have the following configurations.

(1) An imaging apparatus including:
a pixel unit including a photoelectric conversion element and a first transistor that outputs a signal photoelectrically converted by the photoelectric conversion element to a signal line; and
an excessive light amount detection circuit that detects that the photoelectric conversion element receives an excessive amount of light,
the excessive light amount detection circuit including
a second transistor and a capacitor that are connected in series between the signal line and a reference potential node, and
a dummy circuit that adjusts a gate voltage of the second transistor in consideration of at least one of fluctuations in a voltage level of a power supply voltage, a parasitic resistance of the signal line, and variations in a threshold voltage of the first transistor.

(2) The imaging apparatus according to (1), wherein
the dummy circuit includes
a dummy pixel unit including a first dummy transistor corresponding to the first transistor and a dummy signal line connected to the first dummy transistor, and
a second dummy transistor that controls the gate voltage of the second transistor according to a potential of the dummy signal line.

(3) The imaging apparatus according to (2), wherein the gate voltage of the second transistor is controlled such that the parasitic resistance of the signal line and a parasitic capacitance of the dummy signal line are equal.

(4) The imaging apparatus according to (2) or (3), wherein the second dummy transistor and the second transistor form a current mirror circuit.

(5) The imaging apparatus according to any one of (2) to (4), wherein
the first dummy transistor has the same size, the same conductivity type, and the same electrical characteristics as the first transistor, and
the second dummy transistor has the same size, the same conductivity type, and
the same electrical characteristics as the second transistor.

(6) The imaging apparatus according to (3) or (4), including a pixel array unit including a plurality of pixel units arranged in a first direction and a second direction that intersect with each other, wherein the dummy pixel unit is provided in association with two or more of the pixel units arranged in the first direction in the pixel array unit, and the second dummy transistor is provided separately for each of two or more second transistors corresponding to the two or more pixel units arranged in the first direction.

(7) The imaging apparatus according to (6), wherein the dummy pixel unit is provided in association with the two or more second transistors arranged in the same row in the second direction and in the first direction, and the second dummy transistor is provided separately for each of the two or more second transistors arranged in the same row in the second direction and in the first direction.

(8) The imaging apparatus according to (6) or (7), wherein the second dummy transistor is arranged near the corresponding second transistor.

(9) The imaging apparatus according to any one of (6) to (8), wherein the dummy pixel unit is arranged on one end side in the first direction in the pixel array unit.

(10) The imaging apparatus according to (9), wherein the pixel array unit has an effective pixel region and two ineffective pixel regions arranged on both sides of the effective pixel region in the first direction, and the dummy pixel unit is arranged in one of the two ineffective pixel regions.

(11) The imaging apparatus according to any one of (2) to (10), including a voltage follower circuit connected between the dummy signal line and the second dummy transistor.

(12) The imaging apparatus according to any one of (2) to (11), wherein the pixel unit includes a third transistor, connected between the first transistor and the signal line, that switches whether to output a signal amplified by the first transistor to the signal line, the dummy circuit includes a third dummy transistor corresponding to the third transistor, and the third dummy transistor is connected between the first dummy transistor and the dummy signal line.

(13) The imaging apparatus according to any one of (2) to (12), including a differential amplifier that detects a potential difference between a voltage signal corresponding to a potential of the signal line and a ramp wave signal whose voltage level changes with time, wherein the first dummy transistor is turned on in a period for adjusting an offset voltage of the differential amplifier.

(14) The imaging apparatus according to (13), wherein the pixel unit has a floating diffusion that accumulates a charge photoelectrically converted by the photoelectric conversion element, and a fourth transistor that resets the charge held in the floating diffusion, after a first period for detecting the offset voltage of the differential amplifier, a second period is provided for the differential amplifier to detect a potential difference between the voltage signal corresponding to the potential of the signal line and the ramp wave signal in a state where the charge in the floating diffusion is reset, and the excessive light amount detection circuit outputs a signal indicating that the photoelectric conversion element receives an excessive amount of light from a connection node between the second transistor and the capacitor in the second period.

(15) The imaging apparatus according to (14), including a dummy control circuit that supplies a certain potential defining a sunspot detection level to a gate of the first dummy transistor in the first period.

(16) The imaging apparatus according to (15), wherein the dummy control circuit includes a low dropout (LDO) circuit that generates a signal for the gate so as not to be affected by fluctuations in the voltage level of the power supply voltage.

(17) The imaging apparatus according to any one of (2) to (16), wherein the pixel unit outputs a signal corresponding to electrons photoelectrically converted by the photoelectric conversion element to the signal line, and each of the second transistor and the second dummy transistor is an N-type MOS transistor.

(18) The imaging apparatus according to any one of (2) to (16), wherein the pixel unit outputs a signal corresponding to holes photoelectrically converted by the photoelectric conversion element to the signal line, and each of the second transistor and the second dummy transistor is a P-type MOS transistor.

(19) The imaging apparatus according to any one of (1) to (18), wherein a signal is output that indicates that the photoelectric conversion element receives an excessive amount of light from a connection node between the second transistor and the capacitor.

(20) An electronic device including:

an imaging apparatus that outputs a photoelectrically converted imaging signal; and a signal processing unit that performs signal processing on the imaging signal, the imaging apparatus including a pixel unit including a photoelectric conversion element and a first transistor that outputs a signal photoelectrically converted by the photoelectric conversion element to a signal line, and an excessive light amount detection circuit that detects that the photoelectric conversion element receives an excessive amount of light, the excessive light amount detection circuit including a second transistor and a capacitor that are connected in series between the signal line and a reference potential node, and a dummy circuit that adjusts a gate voltage of the second transistor in consideration of at least one of fluctuations in a voltage level of a power supply voltage, a parasitic resistance of the signal line, and variations in a threshold voltage of the first transistor.

Aspects of the present disclosure are not limited to the aforementioned individual embodiments and include various modifications that those skilled in the art can achieve, and effects of the present disclosure are also not limited to the details described above. In other words, various additions, modifications, and partial deletion can be made without departing from the conceptual idea and the gist of the present disclosure that can be derived from the details defined in the claims and the equivalents thereof.

REFERENCE SIGNS LIST 1, 1a, 1p, 1q Excessive light amount detection circuit
2 Pixel array unit
2a Effective pixel region
2b Ineffective pixel column region
2c Ineffective pixel column region
2d Ineffective pixel row region 2e Ineffective pixel row region
3 Row scanning circuit
4 AD conversion unit
5 Column scanning circuit
6 Buffer amplifier
7 Timing control circuit
8 Reference signal generation circuit
9 Dummy circuit
10 Pixel unit
10D Dummy pixel unit
10S Semiconductor layer
10W Wiring layer
11 AD converter circuit
12 Current source
12D Current source
13 Voltage follower circuit
14 Second contact layer
15 Second electrode
15B Conductive film
16 Passivation film
16H Opening
17 Insulating film
18 Buried layer
19A Interlayer insulating film
19B Interlayer insulating film
19E Contact electrode
19ED Dummy electrode
20 Readout circuit substrate
20W Wiring layer
22 Comparator
22C Multilayer wiring layer
22CB Wire
22ED Dummy electrode
23 Counter
25 Current source
26 Current source
27 Buffer
28 Switch
29 Dummy control circuit
29a First voltage follower circuit
29b First resistance voltage divider circuit
29c LDO circuit
29d Second voltage follower circuit
29e Differential amplifier
29f Differential amplifier
29g Differential amplifier
29h PMOS transistor
29i Second resistance voltage divider circuit
30 Element substrate
31 First electrode
32 First contact layer
32A Diffusion region
33 Photoelectric conversion layer
34 Second contact layer
35 Semiconductor substrate
40 Readout circuit substrate
41 Semiconductor thin film
42 P-type layer
43 N-type layer
44 N-type layer
45 Antireflection film
46 Color filter
47 On-chip lens
51 Passivation layer
52 Insulating layer
53A Connection electrode
53B Connection electrode
54 Bump electrode
60 Semiconductor substrate
100 Imaging apparatus
100 Image sensor
101 Clamp circuit
102 Detection circuit
110 Light receiving element

The invention claimed is:

1. An imaging apparatus comprising:
   a pixel unit including a photoelectric conversion element and a first transistor that outputs a signal photoelectrically converted by the photoelectric conversion element to a signal line; and
   an excessive light amount detection circuit that detects that the photoelectric conversion element receives an excessive amount of light,
   the excessive light amount detection circuit including
   a second transistor and a capacitor that are connected in series between the signal line and a reference potential node, and
   a dummy circuit that adjusts a gate voltage of the second transistor in consideration of at least one of fluctuations in a voltage level of a power supply voltage, a parasitic resistance of the signal line, and variations in a threshold voltage of the first transistor.

2. The imaging apparatus according to claim 1, wherein the dummy circuit includes
   a dummy pixel unit including a first dummy transistor corresponding to the first transistor and a dummy signal line connected to the first dummy transistor, and
   a second dummy transistor that controls the gate voltage of the second transistor according to a potential of the dummy signal line.

3. The imaging apparatus according to claim 2, wherein the gate voltage of the second transistor is controlled such that the parasitic resistance of the signal line and a parasitic capacitance of the dummy signal line are equal.

4. The imaging apparatus according to claim 2, wherein the second dummy transistor and the second transistor form a current mirror circuit.

5. The imaging apparatus according to claim 2, wherein the first dummy transistor has the same size, the same conductivity type, and the same electrical characteristics as the first transistor, and
   the second dummy transistor has the same size, the same conductivity type, and
   the same electrical characteristics as the second transistor.

6. The imaging apparatus according to claim 3, comprising a pixel array unit including a plurality of pixel units arranged in a first direction and a second direction that intersect with each other, wherein
   the dummy pixel unit is provided in association with two or more of the pixel units arranged in the first direction in the pixel array unit, and
   the second dummy transistor is provided separately for each of two or more second transistors corresponding to the two or more pixel units arranged in the first direction.

7. The imaging apparatus according to claim 6, wherein
   the dummy pixel unit is provided in association with the two or more second transistors arranged in the same row in the second direction and in the first direction, and
   the second dummy transistor is provided separately for each of the two or more second transistors arranged in the same row in the second direction and in the first direction.

8. The imaging apparatus according to claim 6, wherein the second dummy transistor is arranged near the corresponding second transistor.

9. The imaging apparatus according to claim 6, wherein the dummy pixel unit is arranged on one end side in the first direction in the pixel array unit.

10. The imaging apparatus according to claim 9, wherein
the pixel array unit has an effective pixel region and two ineffective pixel regions arranged on both sides of the effective pixel region in the first direction, and
the dummy pixel unit is arranged in one of the two ineffective pixel regions.

11. The imaging apparatus according to claim 2, comprising a voltage follower circuit connected between the dummy signal line and the second dummy transistor.

12. The imaging apparatus according to claim 2, wherein
the pixel unit includes a third transistor, connected between the first transistor and the signal line, that switches whether to output a signal amplified by the first transistor to the signal line,
the dummy circuit includes a third dummy transistor corresponding to the third transistor, and
the third dummy transistor is connected between the first dummy transistor and the dummy signal line.

13. The imaging apparatus according to claim 2, comprising a differential amplifier that detects a potential difference between a voltage signal corresponding to a potential of the signal line and a ramp wave signal whose voltage level changes with time, wherein
the first dummy transistor is turned on in a period for adjusting an offset voltage of the differential amplifier.

14. The imaging apparatus according to claim 13, wherein
the pixel unit has a floating diffusion that accumulates a charge photoelectrically converted by the photoelectric conversion element, and a fourth transistor that resets the charge held in the floating diffusion,
after a first period for detecting the offset voltage of the differential amplifier, a second period is provided for the differential amplifier to detect a potential difference between the voltage signal corresponding to the potential of the signal line and the ramp wave signal in a state where the charge in the floating diffusion is reset, and
the excessive light amount detection circuit outputs a signal indicating that the photoelectric conversion element receives an excessive amount of light from a connection node between the second transistor and the capacitor in the second period.

15. The imaging apparatus according to claim 14, comprising a dummy control circuit that supplies a certain potential defining a sunspot detection level to a gate of the first dummy transistor in the first period.

16. The imaging apparatus according to claim 15, wherein the dummy control circuit includes a low dropout (LDO) circuit that generates a signal for the gate so as not to be affected by fluctuations in the voltage level of the power supply voltage.

17. The imaging apparatus according to claim 2, wherein
the pixel unit outputs a signal corresponding to electrons photoelectrically converted by the photoelectric conversion element to the signal line, and
each of the second transistor and the second dummy transistor is an N-type MOS transistor.

18. The imaging apparatus according to claim 2, wherein
the pixel unit outputs a signal corresponding to holes photoelectrically converted by the photoelectric conversion element to the signal line, and
each of the second transistor and the second dummy transistor is a P-type MOS transistor.

19. The imaging apparatus according to claim 1, wherein a signal is output that indicates that the photoelectric conversion element receives an excessive amount of light from a connection node between the second transistor and the capacitor.

20. An electronic device comprising:
an imaging apparatus that outputs a photoelectrically converted imaging signal; and
a signal processing unit that performs signal processing on the imaging signal, the imaging apparatus including
a pixel unit including a photoelectric conversion element and a first transistor that outputs a signal photoelectrically converted by the photoelectric conversion element to a signal line, and
an excessive light amount detection circuit that detects that the photoelectric conversion element receives an excessive amount of light,
the excessive light amount detection circuit including
a second transistor and a capacitor that are connected in series between the signal line and a reference potential node, and
a dummy circuit that adjusts a gate voltage of the second transistor in consideration of at least one of fluctuations in a voltage level of a power supply voltage, a parasitic resistance of the signal line, and variations in a threshold voltage of the first transistor.

* * * * *